US006748343B2

(12) United States Patent
Alexander et al.

(10) Patent No.: US 6,748,343 B2
(45) Date of Patent: Jun. 8, 2004

(54) METHOD AND PROCESS FOR CONFIGURING A PREMISES FOR MONITORING

(75) Inventors: Bruce Alexander, Poulsbo, WA (US); Karen Grose, Seattle, WA (US); Christoph Schebel, Suquamish, WA (US); David Antal, Silverdale, WA (US)

(73) Assignee: Vigilos, Inc., Seattle, WA (US)

( * ) Notice: Subject to any disclaimer, the term of this patent is extended or adjusted under 35 U.S.C. 154(b) by 125 days.

(21) Appl. No.: 09/967,485

(22) Filed: Sep. 28, 2001

(65) Prior Publication Data

US 2002/0052719 A1 May 2, 2002

Related U.S. Application Data

(60) Provisional application No. 60/281,256, filed on Apr. 3, 2001, and provisional application No. 60/236,282, filed on Sep. 28, 2000.

(51) Int. Cl.[7] .............................................. G08B 13/00
(52) U.S. Cl. ........................................ 702/188; 340/541
(58) Field of Search .......................... 702/188, 122, 702/123, 182, 183, 186, 187, FOR 103, FOR 135, FOR 134, FOR 155, FOR 170; 709/224, 229, 208, 209, 219, 211, 238, 250, 203, 217, 220, 223, 107; 340/506, 511, 541, 3.1, 521, 531, 825.36, 825.37, 3.9, 286.01; 713/200, 201; 348/152, 153, 154, 155, 180; 700/17, 83, 80, 87, 3, 4, 9; 345/735–739, 741–744, 961, 965, 966, 969, 970

(56) References Cited

U.S. PATENT DOCUMENTS 4,216,375 A 8/1980 Ulch et al. .................. 235/382

4,218,690 A 8/1980 Ulch et al. .................. 340/5.22
4,581,634 A 4/1986 Williams .................... 348/156

(List continued on next page.)

FOREIGN PATENT DOCUMENTS

| EP | 0804031 A | 10/1997 |
| WO | WO 97/07486 A | 2/1997 |
| WO | WO 01/28251 | 4/2001 |

OTHER PUBLICATIONS

EyeCast.com Introduces SchoolCast services for School Safety Officials and Law Enforcement Agencies, Press Release dated Apr. 28, 1999, 2 pages.
EyeCast.com Adds 360–degree Continuous Pan Rotation Cameras to It's[sic] EyeView Service, Press Release dated Mar. 15, 1999, 2 pages.
Screen Printing from www.remotecams.com, "Take a Step Into the Future . . . ," printed Sep. 17, 1999, 7 pages.
EyeCast.com, "EyeCast secures deals . . . ," *Washington Business Journal*, Aug. 13–19, 1999, Tech Section, 2 pages.
EyeCast.com Announces EyeView Control, Press Release dated Oct. 12, 1998, 2 pages.
EyeCast Announces EyeCapture Services, Press Release dated Jul. 8, 1998, 2 pages.
EyeCast.com, Inc., "Providing Live Interactive Video for Surveillance & Monitoring Over the Internet", 27 pages. (No date).

(List continued on next page.)

*Primary Examiner*—Hal Wacheman
(74) *Attorney, Agent, or Firm*—Christensen O'Connor; Johnson Kindness PLLC

(57) ABSTRACT

A system and method for configuring an integrated information system through a common user interface are provided. A user accesses a graphical user interface and selects client, premises, location, monitoring device, and processing rule information. The graphical user interface transmits the user selection to a processing server, which configures one or more monitoring devices according to the user selections.

14 Claims, 23 Drawing Sheets

U.S. PATENT DOCUMENTS

| | | | |
|---|---|---|---|
| 4,714,995 A | 12/1987 | Materna et al. | 707/201 |
| 4,721,954 A | 1/1988 | Mauch | 340/5.54 |
| 4,816,658 A | 3/1989 | Khandwala et al. | 235/382 |
| 4,837,568 A | 6/1989 | Snaper | 340/10.52 |
| 4,839,640 A | 6/1989 | Ozer et al. | 340/5.33 |
| 4,962,473 A | 10/1990 | Crain | 340/541 |
| 4,998,279 A | 3/1991 | Weiss | 340/5.52 |
| 5,097,505 A | 3/1992 | Weiss | 380/270 |
| 5,210,873 A | 5/1993 | Gay et al. | 709/107 |
| 5,475,375 A | 12/1995 | Barrett et al. | 340/5.25 |
| 5,475,378 A | 12/1995 | Kaarsoo et al. | 340/5.6 |
| 5,541,911 A | 7/1996 | Nilakantan et al. | 370/422 |
| 5,544,062 A | 8/1996 | Johnston, Jr. | 700/117 |
| RE35,336 E | 9/1996 | Ulch et al. | 340/5.23 |
| 5,614,890 A | 3/1997 | Fox | 340/5.81 |
| 5,629,981 A | 5/1997 | Nerlikar | 713/168 |
| 5,654,696 A | 8/1997 | Barrett et al. | 340/5.33 |
| 5,680,328 A | 10/1997 | Skorupski et al. | 701/35 |
| 5,682,142 A | 10/1997 | Loosmore et al. | 340/572.1 |
| 5,768,119 A | 6/1998 | Havekost et al. | 700/4 |
| 5,848,143 A | 12/1998 | Andrews et al. | 379/265.09 |
| 5,870,733 A | 2/1999 | Bass et al. | 707/2 |
| 5,903,455 A | 5/1999 | Sharpe, Jr. et al. | 700/83 |
| 5,923,264 A | 7/1999 | Lavelle et al. | 340/5.64 |
| 5,960,174 A | 9/1999 | Dew | 709/208 |
| 6,012,100 A | 1/2000 | Frailong et al. | 709/250 |
| 6,064,723 A | 5/2000 | Cohn et al. | 379/88.14 |
| 6,091,771 A * | 7/2000 | Seeley et al. | 375/240 |
| 6,115,040 A * | 9/2000 | Bladow et al. | 345/741 |
| 6,233,588 B1 | 5/2001 | Marchoili et al. | 707/200 |
| 6,289,380 B1 | 9/2001 | Battat et al. | 709/224 |
| 6,324,647 B1 | 11/2001 | Bowman-Amuah | 713/201 |
| 6,356,949 B1 | 3/2002 | Katsandres et al. | 709/238 |
| 6,369,695 B1 * | 4/2002 | Horon | 340/286.01 |
| 2002/0019945 A1 | 2/2002 | Houston et al. | 713/201 |
| 2002/0029263 A1 | 3/2002 | Toyoshima et al. | 709/223 |

OTHER PUBLICATIONS

Axis Communications, publication entitled "Axis 200+ Web Camera", 2 page. (No date).

Axis Communications, publication entitled "Axis 240 Camera Server", 2 pages (No date).

Axis Communications, www.axis.se/products/cam_240/, "30 Frames/Second", printed Sep. 28, 1999, 2pages.

Axis Communications, www.axis.se/products/camera servers/cam_app_sol.htm, "Network Cameras Applications and Solutions", printed Sep. 28, 1999, 8 pages.

Axis Communications, www.axis.se/products/camera_ servers/cam_fb/html, "Features and Benefits", printed Sep. 28, 1999, 3 pages.

* cited by examiner

METHOD AND PROCESS FOR CONFIGURING A PREMISES FOR MONITORING

CROSS-REFERENCES TO RELATED APPLICATIONS

This application claims the benefit of U.S. Provisional Application No. 60/236,282, filed Sep. 28, 2000, entitled SYSTEM AND METHOD FOR IMPLEMENTING AN INTEGRATED INFORMATION SYSTEM, which is hereby incorporated by reference herein. This application also claims the benefit of U.S. Provisional Application No. 60/281,256, filed Apr. 3, 2001, entitled METHOD AND PROCESS FOR CONFIGURING A PREMISES FOR MONITORING, which also is hereby incorporated by reference.

FIELD OF THE INVENTION

In general, the present invention relates to electronic hardware and computer software, and in particular, to a method and process for configuring a premises for the installation of monitoring devices.

BACKGROUND OF THE INVENTION

Generally described, electronic security systems are configured to provide a wide range of security services in both residential and commercial settings. The types of monitoring devices utilized by a particular security system to perform the system service depend greatly on the sophistication of the security system configuration and the overall function of the security system. A majority of conventional security systems include intrusion detecting devices, such as door or window contacts, glass break detectors, motion detectors and the like. In a commercial setting, closed-circuit television ("CCTV"), badging systems, asset tracking, and access control devices and sensors are also utilized.

The configuration of the security system is based on the function the system will serve. For example, in one aspect, a typical electronic security system may be used to provide smoke, fire, and/or carbon monoxide detection. Accordingly, the system would utilize one or more smoke, fire and/or carbon monoxide detectors within one or more locations on the premises. In another aspect, the security system may also be utilized to provide motion or access detection as well as general video and audio monitoring of the premises. Accordingly, the system would utilize ingress or egress sensors and/or video cameras within the premises.

While the conventional art generally discloses utilizing multiple monitoring devices to perform various functions, conventional systems are deficient in data management functionality and integration. Security data from different monitoring device types is generally not integrated to affect the system reporting and control. Instead, the conventional security system is built around independent stand-alone devices that require human control and interpretation.

In one security configuration, contract or in-house security guard and patrol services are employed in a range of industrial commercial, public and private settings. The primary functions of the security guard may include direct visual surveillance, the monitoring of security cameras or other security devices, a reception or access control and authorization function, and incident response. A security guard may also be used to monitor a number of CCTV screens arranged in a bank formation. Accordingly, the security guard accepts the variety of inputs and makes a determination of a security alert, such as an unauthorized entrance.

The use of dedicated monitoring services, such as security guards is generally prohibitively expensive and unavailable for a majority of individuals and businesses. Additionally, if the guard is distracted, absent or inattentive, a security event may go unreported. Furthermore, the monitoring device data, such as the CCTV data, is typically available only to the dedicated premises monitor and cannot be utilized concurrently by additional users, such as a remote monitor, a quality control supervisor, the owner of the premises, or emergency or public safety authorities. Moreover, a single security guard may not be capable of processing all of the possible monitoring data sources simultaneously, thereby reducing the effectiveness of multiple monitoring devices.

Another security system configuration utilizes external monitors to provide the security services. Generally described, external monitoring systems are more cost effective than a dedicated on-premises monitor. However, most external monitoring systems have a limited effectiveness in being unable to extensively provide and/or review detailed security information. For example, most conventional external monitoring systems cannot incur the expense of providing a sufficient amount of communication bandwidth to transmit continuous video/audio feeds from every monitored premises. Accordingly, if the external monitoring service detects an unauthorized entry into a premises, such as through a signal from a detecting device, the monitoring service typically dispatches emergency or public safety authorities to investigate and determine the extent of the detected event. In a vast majority of cases, the alarm is false and the premises owner incurs a fine for having the authorities verify the incident. Additionally, in the event of an actual emergency, the monitoring service cannot provide the public safety authorities with sufficient information to assess the situation with monitoring devices, thereby putting the authorities at greater risk.

Similar to the dedicated on-premises monitoring, the remote monitoring service also cannot concurrently process the device information to multiple authorized users for various purposes. For example, a premises owner may need to access video data to locate a pet within the premises, while emergency or public safety personnel would need to access the same video data to identify the location of a victim. In both cases, the monitoring service likely cannot provide the information to the user on a wide scale basis.

Some conventional security system configurations attempt to integrate at least some security monitoring devices to better detect alarm conditions from a remote user. For example, a security system monitor (either remote or on-premises) may detect an unauthorized entry from a motion detector and confirm it by utilizing a video camera. Generally however, these systems are directed towards a combination of video surveillance and are limited into being processed solely for the detection of an intrusion or the verification of an intrusion. These systems generally cannot accept additional non-security information inputs that relate generally to the management of the premises and that are outside of the scope of conventional security monitoring. Moreover, these systems are deficient in that the data cannot be processed concurrently or distributed to multiple authorized users. Additionally, the monitoring devices used for these functions are often produced by different manufacturers and employ manufacturer-specific communications protocols. The monitoring devices are typically not configured to be accessible through a common access point for reporting and control. Accordingly, most of the monitoring devices are installed within a premises as independent sub-systems of a security system. The configuration of each of these systems, and often of each of the devices within a system requires a separate configuration and installation process.

In addition to the lack of integration, the sub-systems generally have minimal operability as such, and any updates or modifications to the system typically require the removal and replacement of a wiring panel connected to the monitoring device. Accordingly, the costs associated with cumbersome installations and modifications are formidable. Security end-users desiring a system upgrade or modification are generally faced with the cost of removing an old system so that a change can be made. The replacement cost is further scaled for enterprise type monitoring systems that could require an update of a large number of monitoring devices.

Thus, there is a need for a system and method for communicating configuration and installation information to a diversified group of monitoring devices through a common access point of an integrated information system.

SUMMARY OF THE INVENTION

A system and method for configuring an integrated information system through a common user interface are provided. A user accesses a graphical user interface and selects client, premises, location, monitoring device, and processing rule information. The graphical user interface transmits the user selection to a processing server, which configures one or more monitoring devices according to the user selections.

In accordance with an aspect of the present invention, a method for configuring monitoring devices through a central interface is provided. The method can be implemented in an integrated information system in communication with a number of monitoring devices. A central server obtains a selection of at least one client associated with the integrated information system, a selection of at least one premises associated with the selected client, within the integrated information system, a selection of at least one location wherein the selected location is associated with an identifiable attribute of a premises, a selection of one or more monitoring devices associated with the selected location, and a selection of one or more processing rules associated with one or more selected monitoring device. The central server configures the integrated information system according to the selected client, premises, location, monitoring device and processing rule data. The client, premises, location, monitoring device and processing rule data selections are obtained from a common user interface.

In accordance with another aspect of the present invention, a method for configuring monitoring devices through a central interface is provided. The method may be implemented in an integrated information system in communication with a number of monitoring devices and including a computer system having a display and user input device. A computing device displays on the computer system display a set of available integrated information system clients and obtains a selection from the user input device of at least one client associated with the integrated information system. The computing device then displays on the computer system display a set of available premises corresponding to the selected client and obtains a selection from the user input device of at least premises associated with the selected client. The computing device also displays on the computer system display a set of available locations corresponding to the selected premises, wherein the selected location defines an identifiable attribute of the selected premises and obtains a selection from the user input, device of at least one location corresponding to the selected premises. The computing device further displays on the computer system display a set of available monitoring devices corresponding to the selected locations and obtains a selection from the user input device of one or more monitoring devices corresponding to the selected location. The computing device then displays on the computer system display a set of processing rules associated with each selected monitoring device and obtains a selection from the user input device of one or more processing rules associated with each selected monitoring device, wherein the selected processing rule can include a default processing rule. The computing device transmits the selected client, premises, location, monitoring device and processing rule data for configuration of the integrated information system. The selection client, premises, location, monitoring device and processing rule data is obtained from a common user interface.

In accordance with a further aspect of the present invention, an integrated information system is provided. The integrated information system includes one or more monitoring devices operable to obtain and transmit monitoring data corresponding to a specified premises. The integrated information system also includes at least one processing server operable to communicate with the one or more monitoring devices. The processing server is further operable to configure each monitoring device. The integrated information system further includes a computer display operable to generate a user interface for obtaining a user selection of client, premises, location, monitoring device, and processing rule data and to transmit the data to the processing server. The processing server configures the monitoring devices according to the client, premises, location, monitoring device and processing rule data obtained from the user interface.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
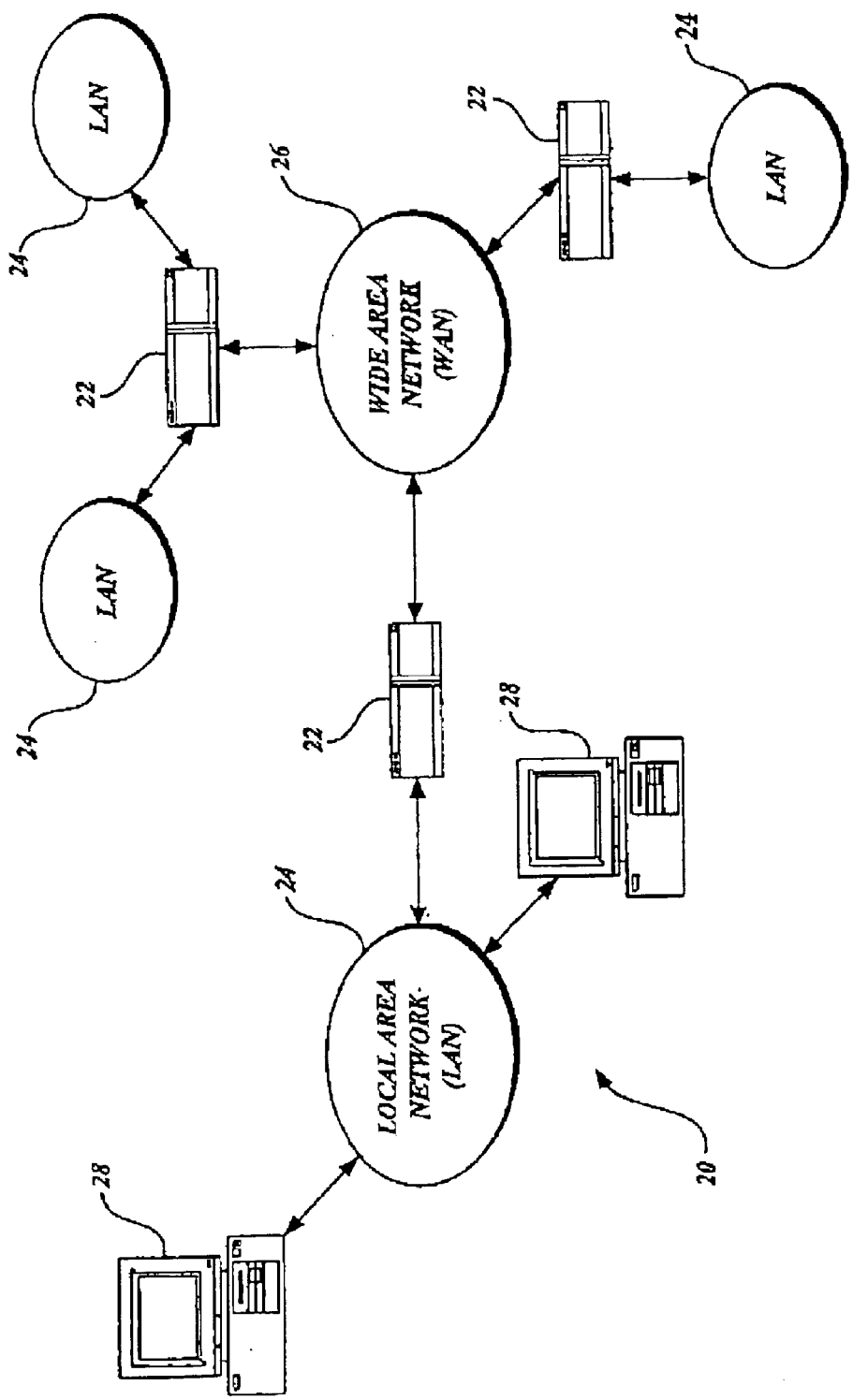
FIG. 1 is block diagram illustrative of representative portion of the Internet.

As described above, aspects of the present invention are embodied in a World Wide Web ("WWW" or "Web") site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, where a plurality of local area networks ("LANs") 24 and a wide area network ("WAN") 26 are interconnected by routers 22. The routers 22 are special purpose computers used to interface one LAN or WAN to another. Communication links within the LANs may be twisted wire pair, coaxial cable, or optical fiber, while communication links between networks may utilize 56 Kbps analog telephone lines, 1 Mbps digital T-1 lines, 45 Mbps T-3 lines, or other communications links known to those skilled in the art.

Furthermore, computers 28 and other related electronic devices can be remotely connected to either the LANs 24 or the WAN 26 via a modem and temporary telephone or wireless link. It will be appreciated that the Internet 20 comprises a vast number of such interconnected networks, computers, and routers and that only a small, representative section of the Internet 20 is shown in FIG. 1.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML") or other markup languages, which are electronically stored at "WWW sites" or "Web sites" throughout the Internet. Other interactive hypertext environments may include proprietary environments, such as those provided in America Online or other online service providers, as well as the "wireless Web" provided by various wireless networking providers, especially those in the cellular phone industry. It will be appreciated that the present invention could apply in any such interactive hypertext environments; however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents. Embedded within a hypertext document are a number of hyperlinks, i.e., highlighted portions of text that link the document to another hypertext document possibly stored at a Web site elsewhere on the Internet. Each hyperlink is assigned a Uniform Resource Locator ("URL") that provides the exact location of the linked document on a server connected to the Internet and describes the document. Thus, whenever a hypertext document is retrieved from any Web server, the document is considered retrieved from the World Wide Web. Known to those skilled in the art, a Web server may also include facilities for storing and transmitting application programs, such as application programs written in the JAVA® programming language from Sun Microsystems, for execution on a remote computer. Likewise, a Web server may also include facilities for executing scripts and other application programs on the Web server itself.

A consumer or other remote access user may retrieve hypertext documents from the World Wide Web via a Web browser program. A Web browser, such as Netscape's NAVIGATOR® or Microsoft's Internet Explorer, is a software application program for providing a graphical user interface to the WWW. Upon request from the consumer via the Web browser, the Web browser locates and retrieves the desired hypertext document from the appropriate Web server using the URL for the document and the HTTP protocol. HTTP is a higher-level protocol than TCP/IP and is designed specifically for the requirements of the WWW. HTTP runs on top of TCP/IP to transfer hypertext documents between server and client computers. The WWW browser may also retrieve programs from the Web server, such as JAVA applets, for execution on the client computer.

Figure 2:
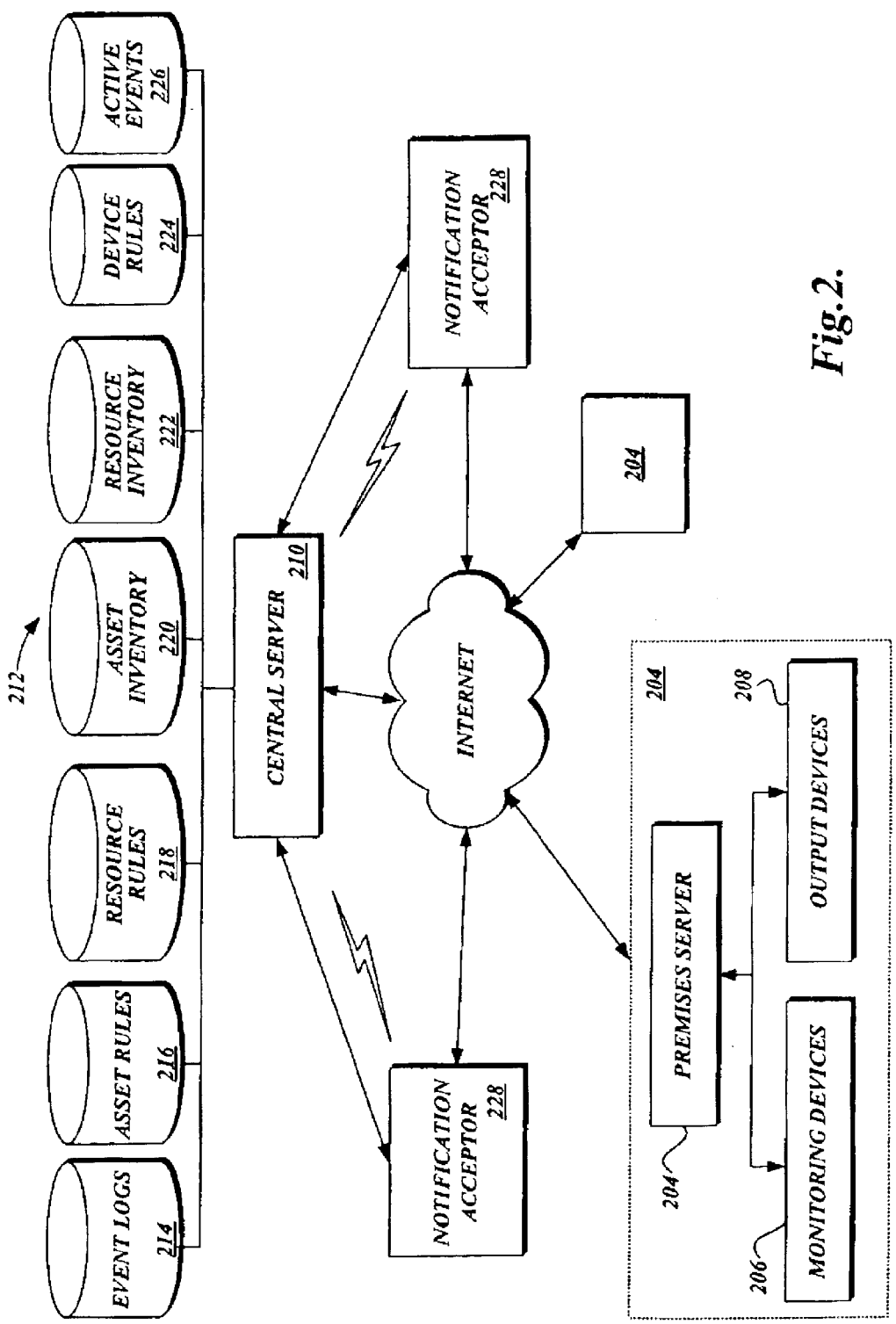
FIG. 2 is a block diagram of an integrated information system utilized to configure or install monitoring devices through a common access point in accordance with the present invention.

Referring now to FIG. 2, an integrated information system 200 for use with the present invention will be described. Generally described, an integrated information system 200 is a subscriber-based system allowing a number of monitoring devices within one or more premises to be monitored from a single control location. Additionally, the data from the monitoring devices is processed according to one or more rules. The control location customizes output of the processed data to a number of authorized users dependent on the preferences and rights of the user. While the system of the present invention is utilized to integrate traditional security monitoring functions, it is also utilized to integrate any information input in a like manner.

In an illustrative embodiment of the present invention, the integrated information system 200 includes one or more premises servers 202 located on any number of premises 204. The premises server 202 communicates with one or more monitoring devices 206. In an illustrative embodiment, the monitoring devices 206 can include smoke, fire and carbon monoxide detectors. The monitoring devices 206 can also include door and window contacts, glass break detectors, motion sensors, audio detectors and/or infrared detectors. Still further, the monitoring devices 206 can include computer network monitors, voice identification devices, card readers, video cameras, still cameras, microphones and/or fingerprint, facial, retinal, or other biometric identification devices. Still further, the monitoring devices 206 can include conventional panic buttons, global positioning satellite ("GPS") locators, other geographic locators, medical indicators, and vehicle information systems. The monitoring devices 206 can also be integrated with other existing information systems, such as inventory control systems, accounting systems, or the like. The premises server 202 can also maintain a device interface database for translating standard protocol-encoded tasks into device specific commands as will be explained in greater detail below. Alternatively, the premises server 202 may be in communication with a separate device server that maintains the device interface database. It will be apparent to one skilled in the relevant art that additional or alternative monitoring devices 206 may be practiced with the present invention.

The premises server 202 also communicates with one or more output devices 208. In an illustrative embodiment, the output devices 208 can include audio speakers, display or other audio/visual displays. The output devices 208 may also include electrical or electromechanical devices that allow the system to perform actions. The output devices 208 can include computer system interfaces, telephone interfaces, wireless interfaces, door and window locking mechanisms, aerosol sprayers, and the like. As will be readily understood by one skilled in the art, the type of output device 208 is associated primarily with the type of action the system produces. Accordingly, additional or alternative output devices 208 are considered to be within the scope of the present invention.

The premises server 202 is in communication with a central server 210. Generally described, the central server 210 obtains the various monitoring device data, processes the data, and outputs the data to one or more authorized users. In an illustrative embodiment, the communication between the central server 210 and the premises server 202 is remote and two-way. One skilled in the relevant art will understand that the premises server 202 may be remote from the premises or may omitted altogether. In such an alternative embodiment, the monitoring devices 206 transmit the monitoring data to a remote premises server 202 or alternatively, they transmit the monitoring data directly to the central server 210. Alternatively, one skilled in the relevant art will also appreciate that the premises server 202 may also perform one or more of the functions illustrated for the central server 210.

Also in communication with the central server 210 is a central database 212. In an illustrative embodiment, the central database 212 includes a variety of databases including an event logs database 214, an asset rules database 216, a resource rules database 218, an asset inventory database 220, a resource inventory database 222, an event rules database 224, and an active events database 226. The utilization of some of the individual databases within the central database will be explained in greater detail below. As will be readily understood by one skilled in the relevant art, the central database may be one or more databases that may be remote from one another. In an alternative embodiment, the central server 210 also maintains a device interface database for translating standard protocol-encoded tasks into device specific commands as will be explained in greater detail below. Accordingly, the central server 210 may perform some or all of the translation actions in accordance with the present invention.

With continued reference to FIG. 2, the central server 210 communicates with one or more notification acceptors 228. In an illustrative embodiment, the notification acceptors 228 can include one or more authorized users who are associated with the notification acceptor 228. Each authorized user has a preference of notification means and rights to the raw and processed monitoring data. The authorized users include premises owners, security directors or administrators, on-site security guards, technicians, remote monitors (including certified and non-certified monitors), customer service representatives, emergency personnel, and others. Moreover, the notification acceptor 228 may be a centralized facility/device that can be associated with any number of authorized users. As will be readily understood by one skilled in the art, various user authorizations may be practiced with the present invention. Additionally, it will be further understood that one or more of the rules databases may be maintained outside of the central server 210.

In an illustrative embodiment of the present invention, the central server 210 communicates with the notification acceptors 228 utilizing various communication devices and communication mediums. The devices include personal computers, hand-held computing devices, wireless application protocol enabled wireless devices, cellular or digital telephones, digital pagers, and the like. Moreover, the central server 210 may communicate with these devices via the Internet utilizing electronic messaging or Web access, via wireless transmissions utilizing the wireless application protocol, short message services, audio transmissions, and the like. As will be readily understood by one skilled in the art, the specific implementation of the communication mediums may require additional or alternative components to be practiced. All are considered to be within the scope of practicing the present invention.

In an illustrative embodiment of the present invention, the central server 210 may utilize one or more additional server-type computing devices to process incoming data and outgoing data, referred to generally as a staging server. The staging server may be a separate computing device that can be proximate to or remote from the central server 210, or alternatively, it may be a software component utilized in conjunction with a general-purpose server computing device. One skilled in the relevant art will appreciate communications between the central server 210 and the staging server can incorporate various security protocols known to those skilled in the relevant art.

Figure 3:
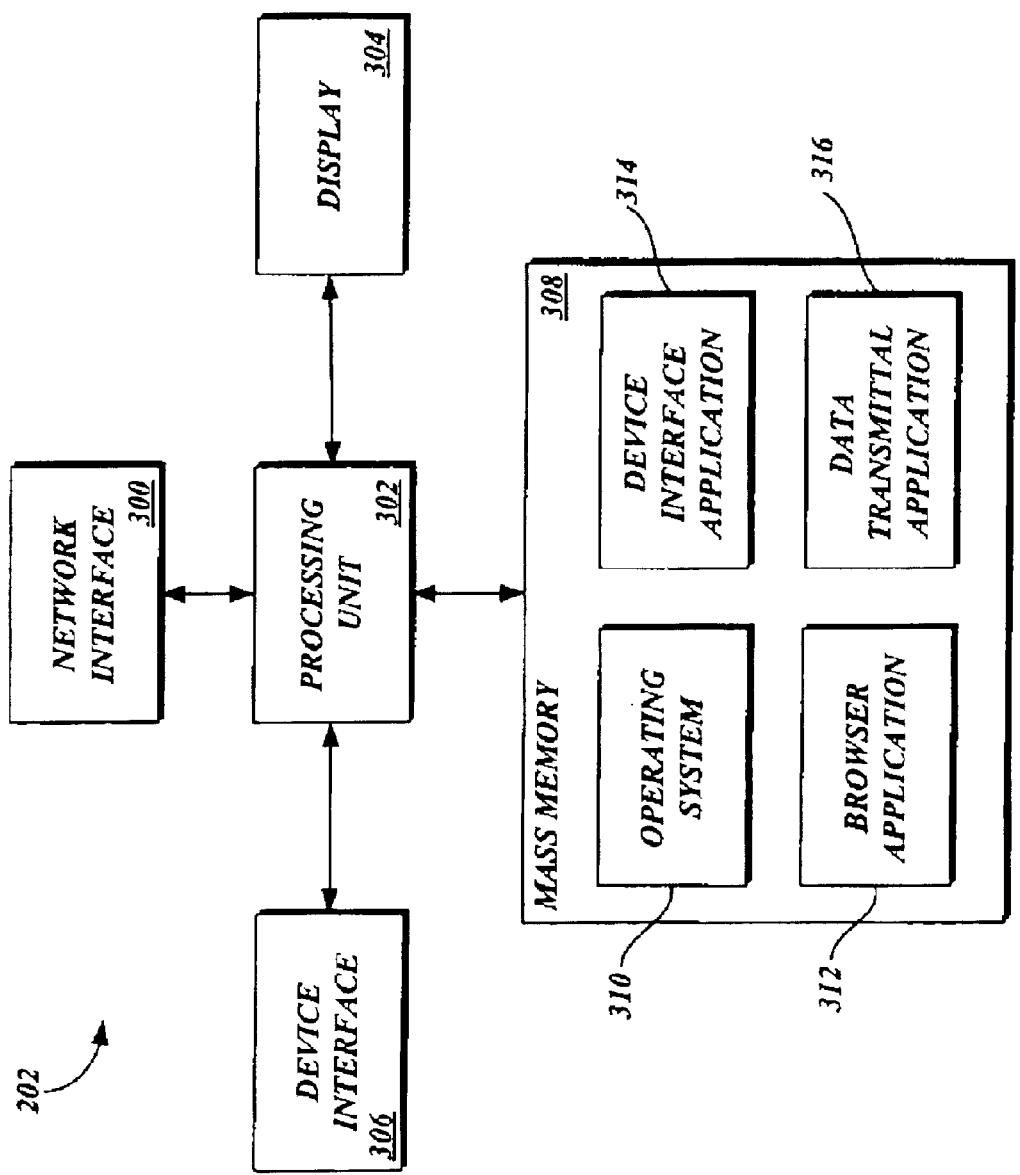
FIG. 3 is a block diagram depicting an illustrative architecture for a premises server in accordance with the present invention.

FIG. 3 is a block diagram depicting an illustrative architecture for a premises server 202 formed in accordance with the present invention. Those of ordinary skill in the art will appreciate that the premises server 202 includes many more components then those shown in FIG. 3. However, it is not necessary that all of these generally conventional components be shown in order to disclose an illustrative embodiment for practicing the present invention. As shown in FIG. 3, the premises server 202 includes a network interface 300 for connecting directly to a LAN or a WAN, or for connecting remotely to a LAN or WAN. Those of ordinary skill in the art will appreciate that the network interface 300 includes the necessary circuitry for such a connection, and is also constructed for use with the TCP/IP protocol or other protocols, such as Internet Inter-ORB Protocol ("IIOP"). The premises server 202 may also be equipped with a modem for connecting to the Internet through a point-to-point protocol ("PPP") connection or a serial-line Internet protocol ("SLIP") connection as known to those skilled in the art.

The premises server 202 also includes a processing unit 302, a display 304, a device interface 306 and a mass memory 308, all connected via a communication bus, or other communication device. The device interface 306 includes hardware and software components that facilitate interaction with a variety of the monitoring devices 206 via a variety of communication protocols including TCP/IP, X10 digital I/O, RS-232, RS-485 and the like. Additionally, the device interface facilitates communication via a variety of communication mediums including telephone landlines, wireless networks (including cellular, digital and radio networks), cable networks, and the like. In an actual embodiment of the present invention, the I/O interface is implemented as a layer between the server hardware and software applications utilized to control the individual digital image devices. One skilled in the relevant art will understand that alternative interface configurations may be practiced with the present invention.

The mass memory 308 generally comprises a RAM, ROM, and a permanent mass storage device, such as a hard disk drive, tape drive, optical drive, floppy disk drive, or combination thereof. The mass memory 308 stores an operating system 310 for controlling the operation of the premises server 202. It will appreciated that this component may comprise a general-purpose server operating system as is known to those skilled in the art, such as UNIX, LINUX™, or Microsoft WINDOWS NT®. The memory also includes a WWW browser 312, such as Netscape's NAVIGATOR® or Microsoft's Internet Explorer, for accessing the WWW.

The mass memory also stores program code and data for interfacing with various premises monitoring devices 206, for processing the monitoring device data and for transmitting the data to a central server. More specifically, the mass memory stores a device interface application 314 in accordance with the present invention for obtaining standard protocol-encoded commands and for translating the commands into device specific protocols. Additionally, the device interface application 314 obtains monitoring device data from the connected monitoring devices 206 and manipulates the data for processing by a central server 210, and for controlling the features of the individual monitoring devices 206. The device interface application 314 comprises computer-executable instructions which, when executed by the premises server, obtains and transmits device data as will be explained below in greater detail. The mass memory also stores a data transmittal application program 316 for transmitting the device data to the central server and to facilitate communication between the central server and the monitoring devices 206. The operation of the data transmittal application 316 will be described in greater detail below. It will be appreciated that these components may be stored on a computer-readable medium and loaded into the memory of the premises server 202 using a drive mechanism associated with the computer-readable medium, such as a floppy, CD-ROM, DVD-ROM drive, or network interface 300.

Figure 4:
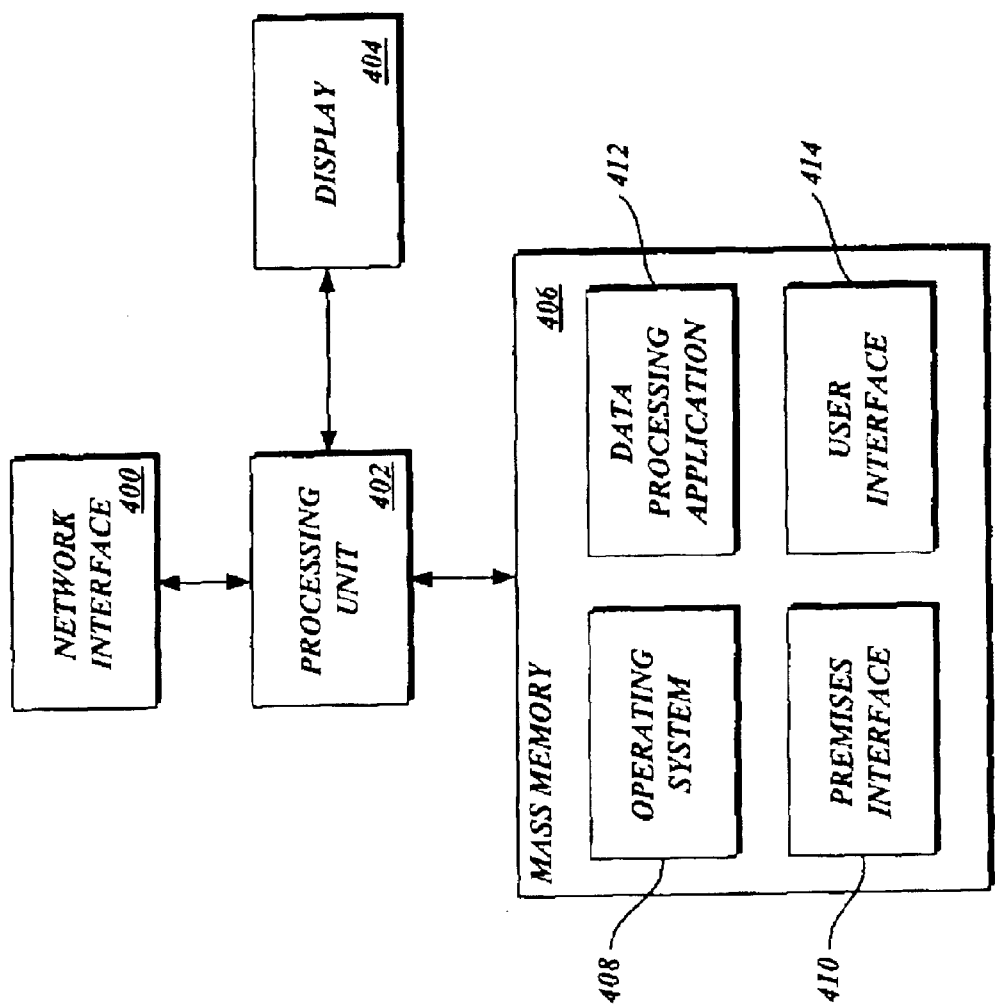
FIG. 4 is a block diagram depicting an illustrative architecture for a central server in accordance with the present invention.

FIG. 4 is a block diagram depicting an illustrative architecture for a central server 210. Those of ordinary skill in the art will appreciate that the central server 210 includes many more components then those shown in FIG. 4. However, it is not necessary that all of these generally conventional components be shown in order to disclose an illustrative embodiment for practicing the present invention. As shown in FIG. 4, the central server 210 includes a network interface 400 for connecting directly to a LAN or a WAN, or for connecting remotely to a LAN or WAN. Those of ordinary skill in the art will appreciate that the network interface 400 includes the necessary circuitry for such a connection, and is also constructed for use with the TCP/IP protocol or other protocols, such as Internet Inter-ORB Protocol ("IIOP"). The central server 210 may also be equipped with a modem for connecting to the Internet through a PPP connection or a SLIP connection as known to those skilled in the art.

The central server 210 also includes a processing unit 402, a display 404, and a mass memory 406, all connected via a communication bus, or other communication device. The mass memory 406 generally comprises a RAM, ROM, and a permanent mass storage device, such as a hard disk drive, tape drive, optical drive, floppy disk drive, or combination thereof. The mass memory 406 stores an operating system for controlling the operation of the central server 210. It will be appreciated that this component may comprise a general-purpose server operating system as is known to those skilled in the art, such as UNIX, LINUX™, or Microsoft WINDOWS NT®. In an illustrative embodiment of the present invention, the central server 210 may also be controlled by a user through use of a computing device, which may be directly connected to or remote from the central server 210.

The mass memory 406 also stores program code and data for interfacing with the premises devices, for processing the device data, and for interfacing with various authorized users. More specifically, the mass memory 406 stores a premises interface application 410 in accordance with the present invention for obtaining data from a variety of monitoring devices 206 and for communicating with the premises server 202. The premises interface application 410 comprises computer-executable instructions that when executed by the central server 210, interface with the premises server 202 as will be explained below in greater detail. The mass memory 406 also stores a data processing application 412 for processing monitoring device data in accordance with rules maintained within the central server 210. The operation of the data processing application 412 will be described in greater detail below. The mass memory 406 further stores an authorized user interface application 414 for outputting the processed monitoring device data to a variety of authorized users in accordance with the security process of the present invention. The operation of the authorized user interface application 414 will be described in greater detail below. It will be appreciated that these components may be stored on a computer-readable medium and loaded into the memory of the central server 210 using a drive mechanism associated with the computer-readable medium, such as a floppy, CD-ROM, DVD-ROM drive, or network interface 400.

Generally described, the present invention provides an integrated computerized system and method utilizing a software interface to install one or more networked hardware monitoring and output devices into an integrated information system. Specifically, aspects of the present invention will be described in relation to a system and method for managing monitoring devices 206 within a common network architecture. In an actual embodiment of the present invention, an application program interface ("API") screen display may be generated by a computing device and utilized to collect the data from a user to configure a premises for monitoring. In accordance with this embodiment, a user accesses an installation or account setup page using a Web browser on a browser computer. The Web page may be standard screen display generated by a browser application executing a markup language, such as hypertext markup language ("HTML"), extensible markup language ("XML"), or other languages conforming to the standard general markup language ("SGML") information management standard. In an illustrative embodiment of the present invention, the browser computer may connect to the integrated information system 200 through the central server 210. Alternatively, the browser computer may connect directly to the integrated information system 200. By entering, reviewing and or modifying data on the screen interface, the user can perform a variety of installation, configuration and modification functions relating to the integrated information system.

Prior to discussing the implementation of the present invention, a general overview of an integrated information system 200 in which the present invention can be implemented will be described. In an actual embodiment of the present invention, the monitoring device data is categorized as asset data, resource data or device data. Asset data is obtained from a monitoring device 206 corresponding to an identifiable object that is not capable of independent action. For example, asset data includes data obtained from a bar code or transponder identifying a particular object, such as a computer, in a particular location. Resource data is obtained from a monitoring device corresponding to an identifiable object that is capable of independent action. For example, resource data includes data from a magnetic card reader that identifies a particular person who has entered the premises. Event data is obtained from a monitoring device corresponding to an on/off state that is not correlated to an identifiable object. Event data is a default category for all of the monitoring devices. As will be readily understood by one skilled in the relevant art, alternative data categorizations are considered to be within the scope of the present invention.

The monitoring device data is obtained by the monitoring devices 206 on the premises server 202 and transmitted to the central server 210. The central server 210 receives the monitoring device data and processes the data according to a rules-based decision support logic. In an actual embodiment of the present invention, the central server 210 utilizes the databases 212 to store logic rules for asset data, resource data and event data. Moreover, because the monitoring device data is potentially applicable to more than one authorized user, multiple rules may be applied to the same monitoring device data. In an alternative embodiment, the databases 212 may be maintained in locations remote from the central server 210.

In the event the processing of the monitoring device rules indicates that action is required, the central server 210 generates one or mom outputs associated with the rules. The outputs include communication with indicated notification acceptors 228 according to the monitoring device data rules. For example, an authorized user may indicate a hierarchy of communication mediums (such as pager, mobile telephone, land-line telephone) that should be utilized in attempting to contact the user. The rules may also indicate contingency contacts in the event the authorized user cannot be contacted. Additionally, the rules may limit the type and/or amount of data the user is allowed to access. Furthermore, the outputs can include the initiation of actions by the central server 210 in response to the processing of the rules. A more detailed description of an implementation of an integrated information system may be found in commonly owned U.S. application Ser. No. 09/825,506 entitled SYSTEM AND METHOD FOR PROVIDING CONFIGURABLE SECURITY MONITORING UTILIZING AN INTEGRATED INFORMATION SYSTEM, filed Apr. 3, 2001, which is incorporated by reference herein.

Figure 5A:
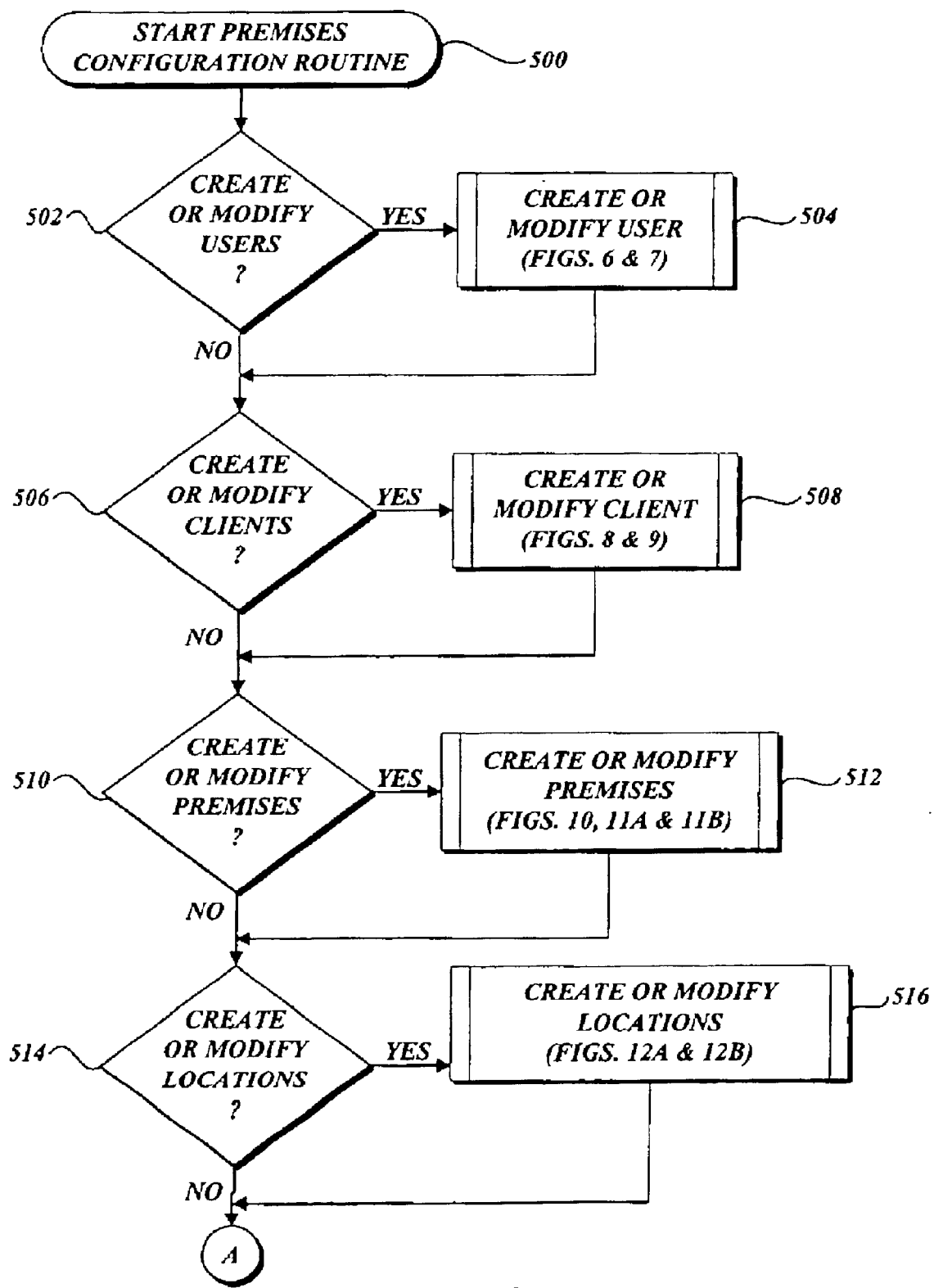
FIGS. 5A and 5B are flow diagrams illustrative of a premises configuration routine implemented by an integrated information system in accordance with the present invention.
Figure 5B:
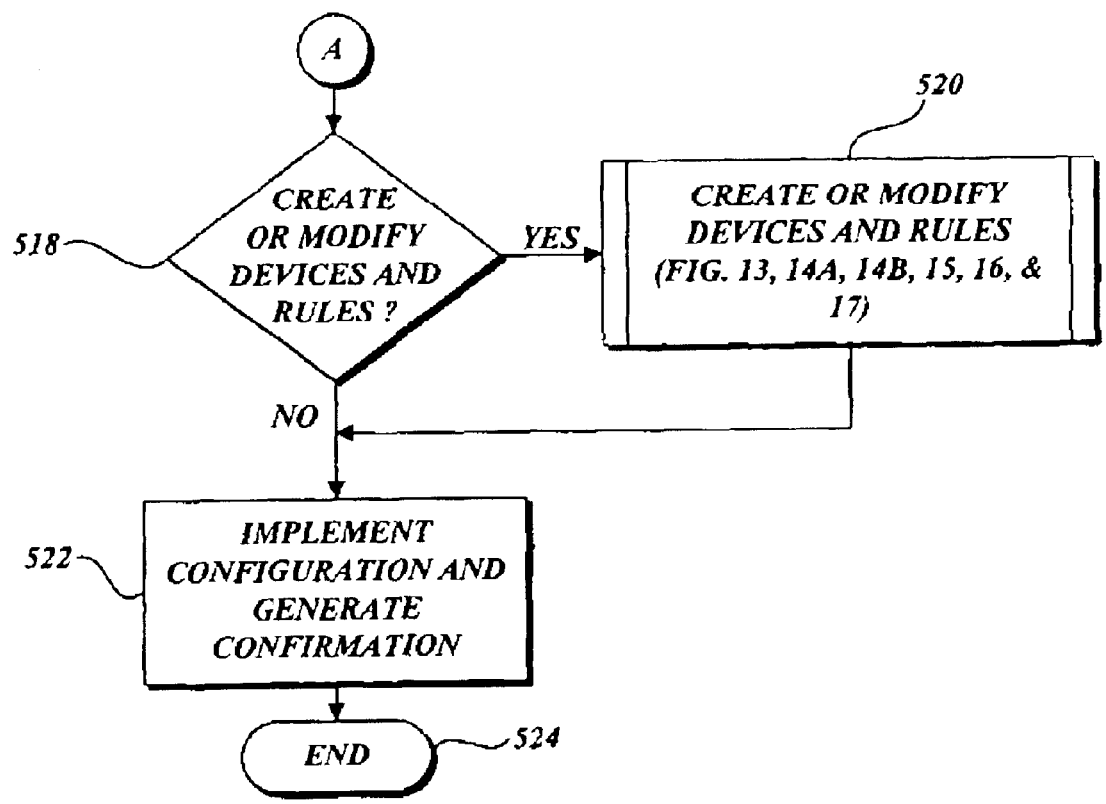

Turning now to FIGS. 5A and 5B, a routine 500 for processing a premises configuration in an integrated information system 200 will be described. More specifically, in accordance with the present invention, the routine 500 relates to a process for obtaining user, client, premises, location, monitoring device, and processing rule data from a user by utilizing a common user interface.

With reference to FIG. 5A, at decision block 502, a test is conducted to determine whether the user wishes to create or modify a number of users to the integrated information system 200. In accordance with the present invention, a user may be selected to have access to the configurations system of the integrated information system 200. Alternatively, a user may be selected to have access as a notified user of the integrated information system. In an illustrative embodiment of the present invention, block 502 may be executed in the user selects to modify or create a user, such as by manipulating a user input device. Alternatively, the user interface application 414 of the central server 210 may prompt a user to determine whether the action is desired. If the user does not select a create or modify an integrated information system user option, the routine 500 proceeds to decision block 506, which will be described in greater detail below. Alternatively, if the user wishes to create or modify a user, the routine processes the create or modify user request at block 504.

Figure 6:
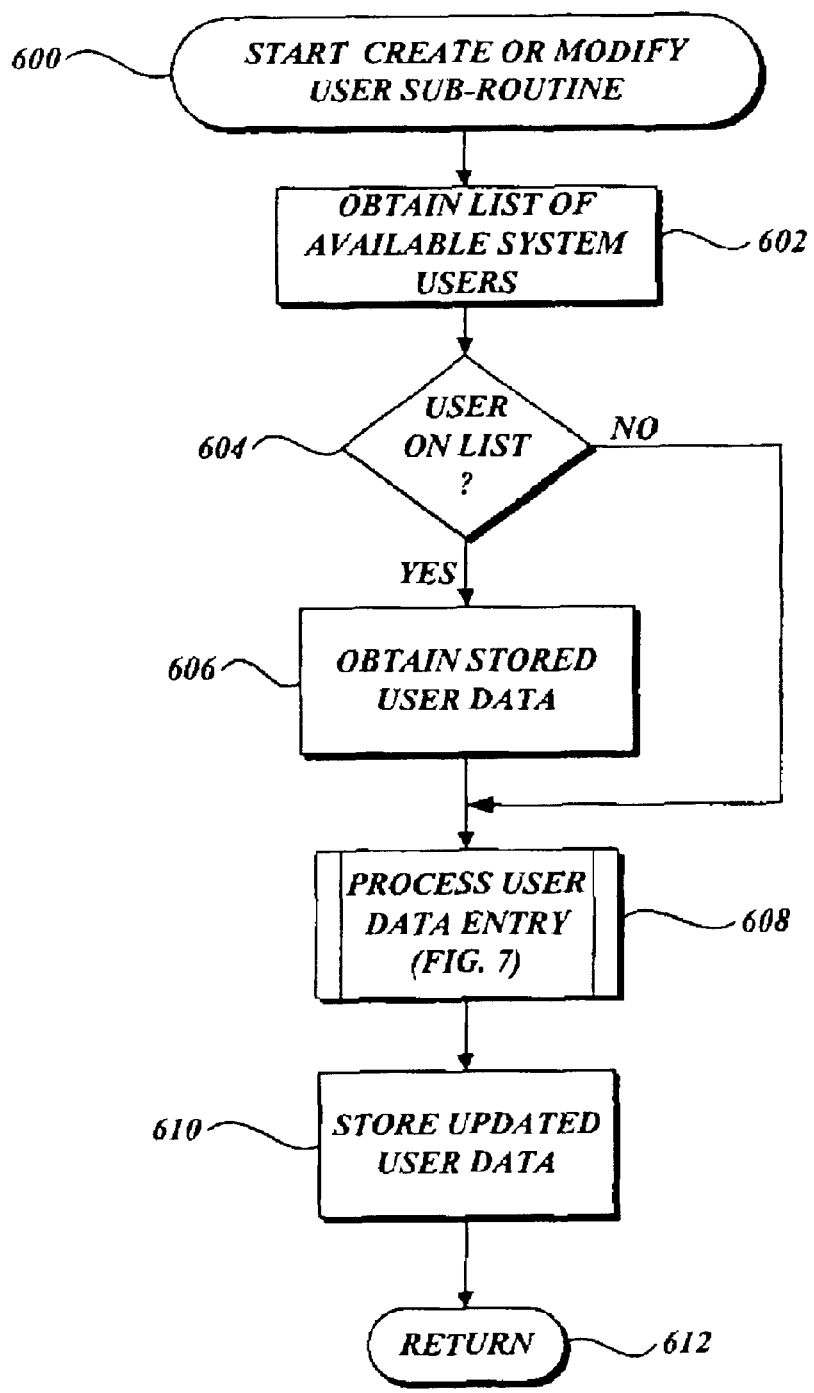
FIG. 6 is a flow diagram illustrative of a create or modify users sub-routine implemented by an integrated information system in accordance with the present invention.
Figure 7:
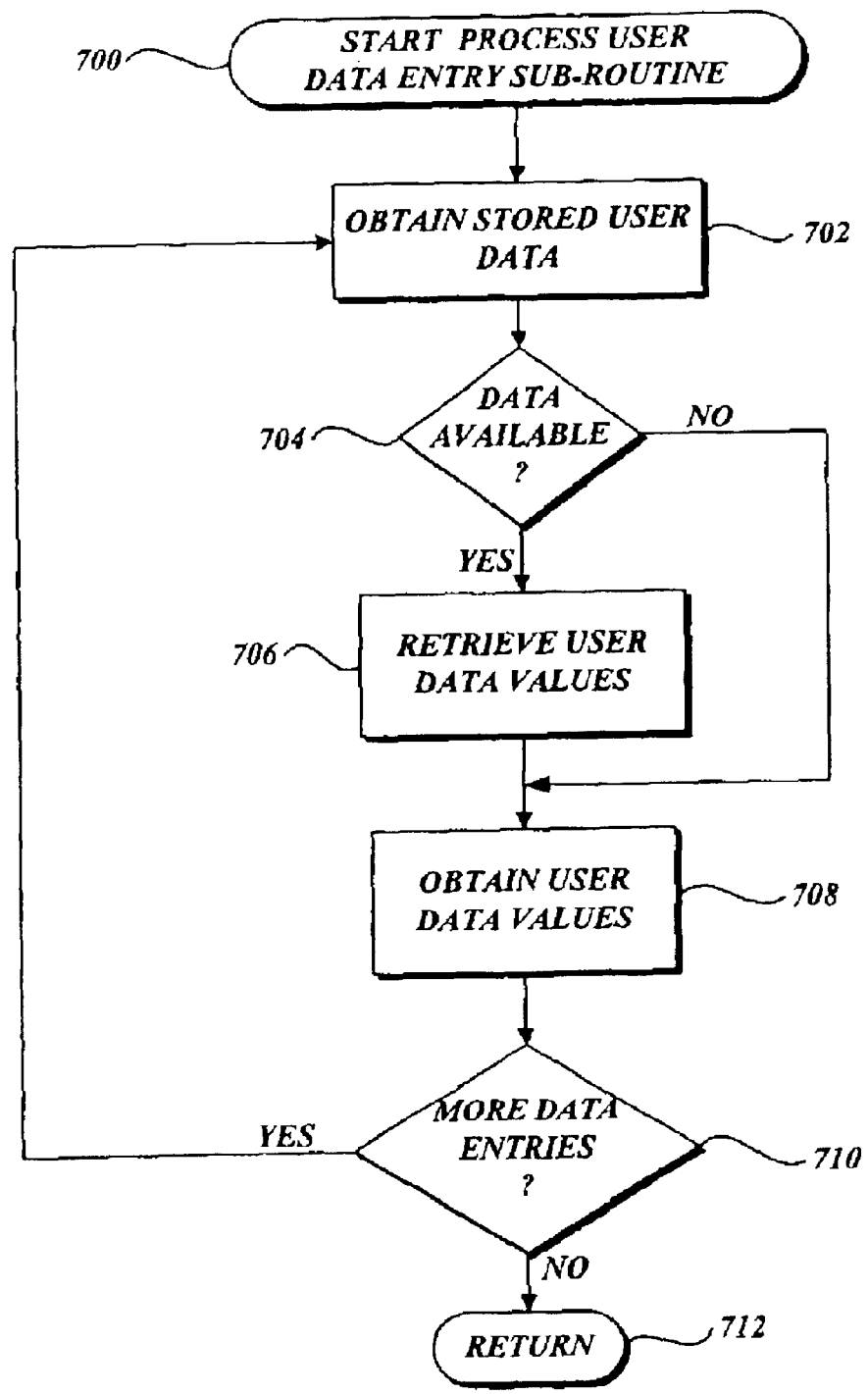
FIG. 7 is a flow diagram illustrative of a process user data entry sub-routine implemented by an integrated information system in accordance with the present invention.

FIGS. 6 and 7 are flow diagrams illustrative of a create or modify user sub-routine implemented by the central server 210 in accordance with the present invention. With reference to FIG. 6, at block 602, the central server 210 obtains a list of available integrated information system users. At decision block 604, a test is conducted to determine whether a particular user is on the list. In an illustrative embodiment of the present invention, the user interface application 414 of the central server 210 may display a list of available system users and allow the user to select from the list. If a desired user is on the list, the central server 210 retrieves user data. In an illustrative embodiment, the central server 210 may recall the user data from the database 212. If the user is not on the displayed list, or once the selected user data has been retrieved, at block 608, the central server 210 processes the input of user data. Once the central server 210 has processed the user data entry at block 608, at block 610, the central server stores the updated user data, and the sub-routine 600 returns to routine 500 at block 612.

FIG. 7 is a flow diagram illustrative of a process user data entry sub-routine 700 implemented by the central server 210 in accordance with the present invention. At block 702, the central server 210 attempts to obtain the stored user data from the database 212. At decision block 704, a test is conducted to determine whether the stored user data is available. If the data is available, the central server retrieves the user data values. Alternatively, if the data is not available, or once the central server 210 has retrieved the stored user data values, at block 708 the central server 210 obtains additional user values from the user. In an illustrative embodiment of the present invention, the user interface application 414 of the central server 210 obtains additional user values by accepting inputs. For example, the user interface application 414 may import data files, obtain keyboard or computer mouse entries, obtain voice inputs, and the like. In one aspect, the user data entry can include data modifying an existing user data record. In another aspect, the user data entry can include data defining new user data records.

At decision block 710, a test is conducted to determine whether more data entries are desired. For example, the central server 210 may process data entries for a number of integrated information users. If more data entries are requested, the routine 700 returns to block 702. Alternatively, if no more data entries are requested, the sub-routine 700 returns to sub-routine 600 at block 712.

Returning to FIG. 5A, at decision block 506, a test is done to determine whether the user wishes to create or modify integrated information system 200 clients. Similar to decision block 502, decision block 506 may be executed by obtaining the initiation of a user action or by prompting a user. If the user does not wish to create or modify clients, the routine 500 proceeds to decision block 510, which will be described in detail below. Alternatively, if the user wishes to create or modify clients, the central server 210 processes the create or modify client request at block 508.

Figure 8:
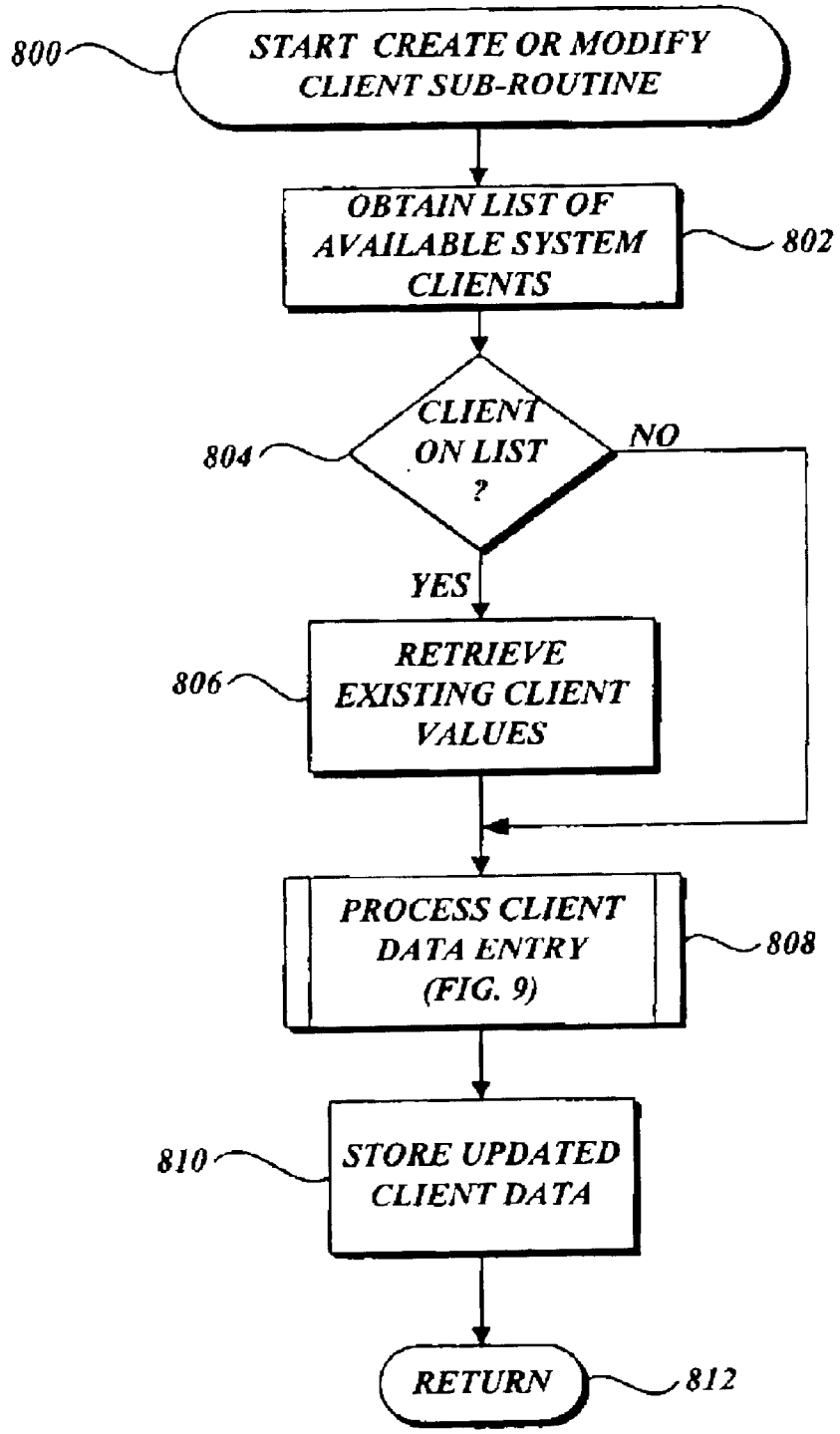
FIG. 8 is a flow diagram illustrative of a create or modify clients sub-routine implemented by an integrated information system in accordance with the present invention.
Figure 9:
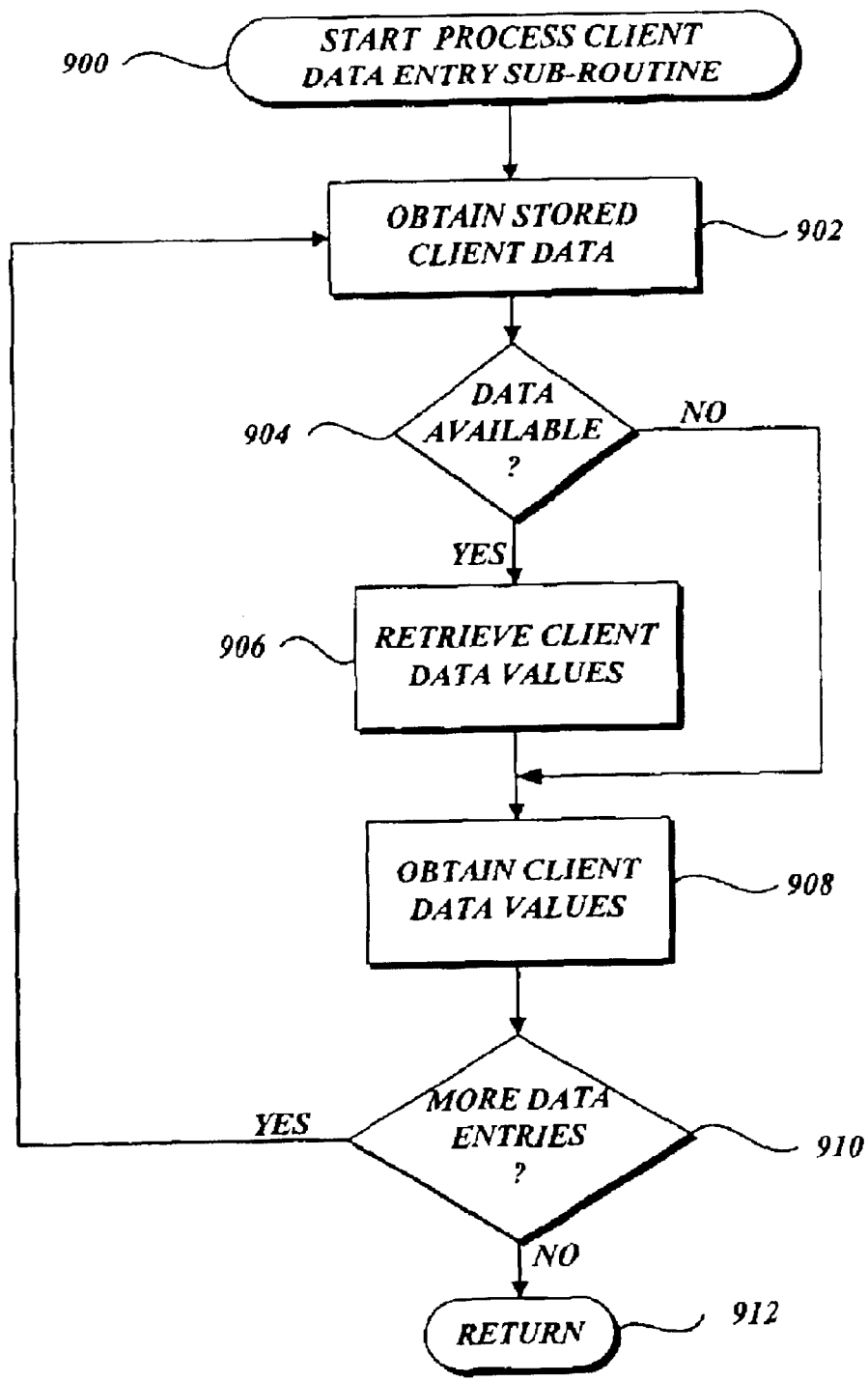
FIG. 9 is a flow diagram illustrative of a process client data entry sub-routine implemented by an integrated information system in accordance with the present invention.

FIGS. 8 and 9 are flow diagrams illustrative of various process create or modify client data sub-routines implemented by the central server 210 in accordance with the present invention. With reference to FIG. 8, at block 802, the central server 210 obtains a list of available system clients. At block 804, a test is conducted to determine whether a desired client is on the list of available system clients. In an illustrative embodiment of the present invention, the user interface application 414 of the central server 210 may display a list of available system users and allow the user to select from the list. If the client is on the list, at block 806 the central server 210 retrieves the existing client data values. If the client not on the list, or once the existing client values have been retrieved, at block 808, the central server 210 process the client data entry. Once the central server 210 has processed the client data entry at block 808, the central server stores the updated user data at block 810. At block 812, the sub-routine 800 returns to routine 500.

FIG. 9 is a flow diagram of a process client data entry sub-routine 900 implemented by the central server 210 in accordance with the present invention. At block 902, the central server 210 attempts to obtain the stored client data. At decision block 904, a test is conducted to determine whether the client data is available. If the data is available, the central server 210 retrieves the client data values at block 906. If the client data is not previously stored, or once the client has been retrieved, at block 908, the user interface 414 application of the central server 210 obtains client data values inputs from the user. For example, the user interface application 414 may import data files, obtain keyboard or computer mouse entries, obtain voice inputs, and the like. In one aspect, the user data entry can include data modifying an existing user data record. In another aspect, the user data entry can include data defining new user data records.

Once the client data values have been obtained by the user interface application 414, at decision block 910, a test is conducted to determine whether more client data entries are desired. If more data entries are available, the sub-routine 900 returns to block 902. Alternatively, if no more data entries are available, the routine 900 returns to sub-routine 800 at block 912.

Returning to FIG. 5A, at decision block 510, a test is conducted to determine whether the user wishes to create or modify one or more premises associated with the selected integrated information system client. In accordance with the present invention, the integrated information system 200 provides monitoring services for a client that may be associated with one or more premises to be monitored, such as multiple building within one or more geographic locations. Similar to the other decision blocks of FIG. 5A, in an illustrative embodiment of the present invention, decision block 510 may be executed in the user selects to modify or create a user, such as by manipulating a user input device. Alternatively, the user interface application 414 of the central server 210 may prompt a user to determine whether the action is desired. If the user does not wish to create or modify a premises on the integrated information system 200, the routine 500 proceeds to decision block 514, which will be explained in greater detail below. Alternatively, if the user wishes to create or modify locations, the central server 210 processes the create or modify locations request at block 508.

Figure 10:
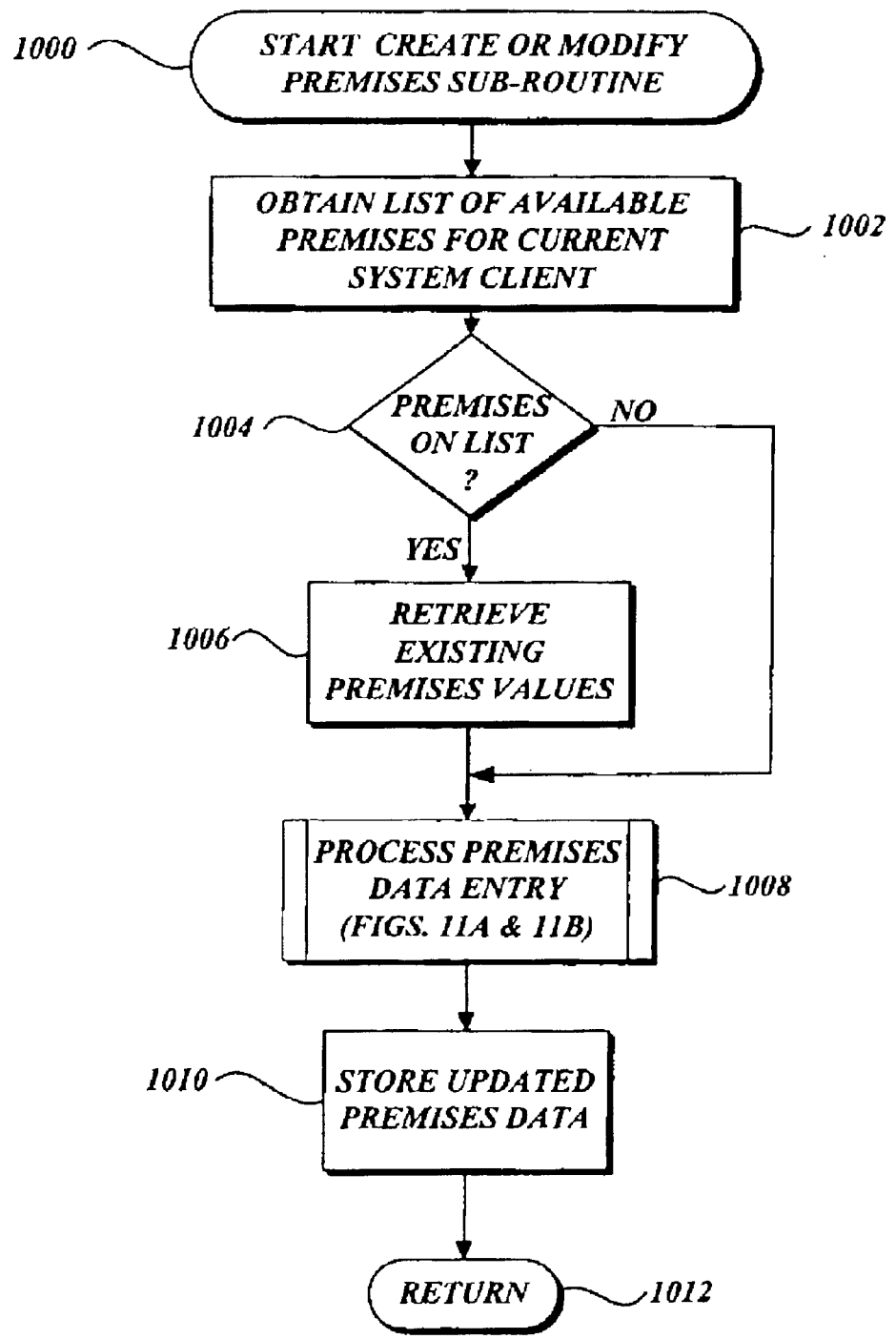
FIG. 10 is a flow diagram illustrative of a create or modify premises sub-routine implemented by an integrated information system in accordance with the present invention.
Figure 11A:
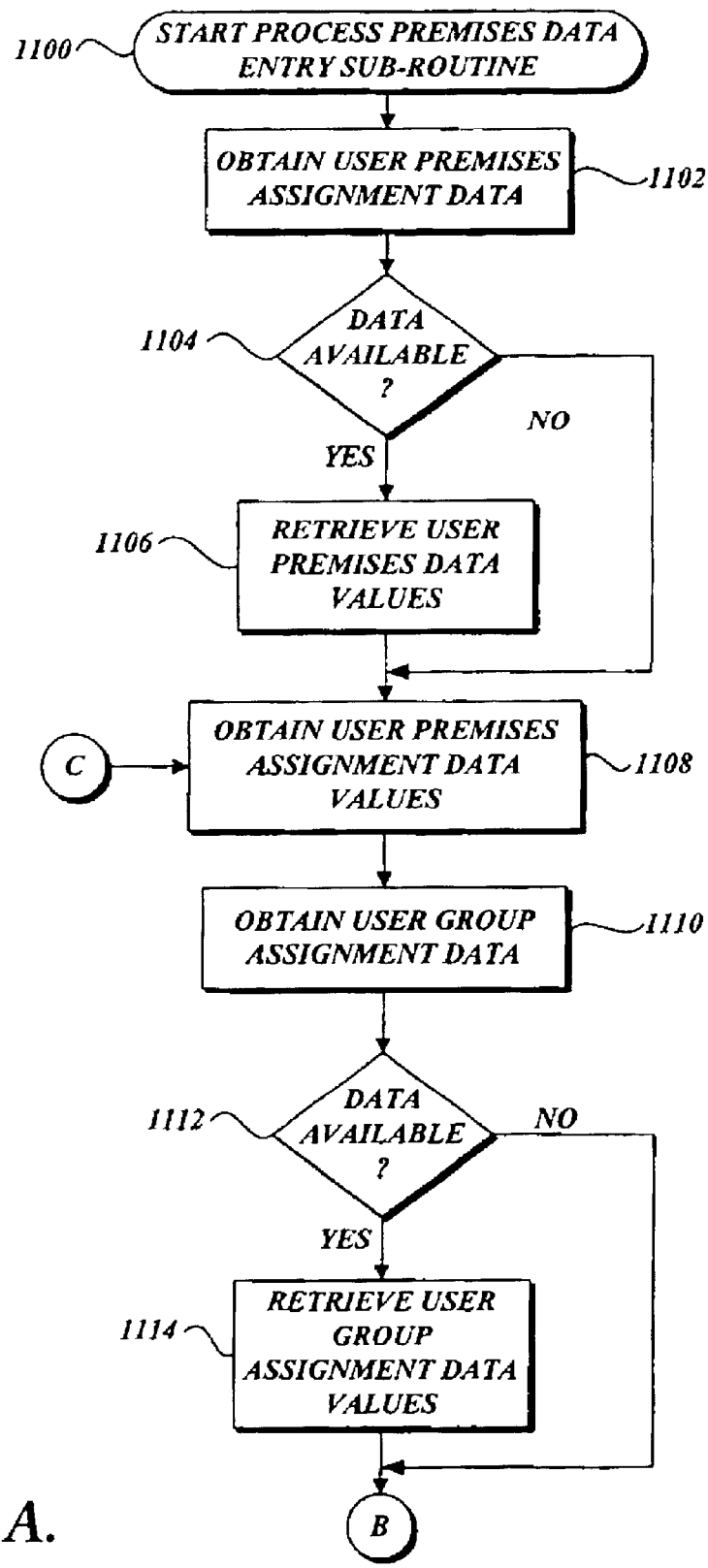
FIGS. 11A and 11B are flow diagrams illustrative of a process premises data entry sub-routine implemented by an integrated information system in accordance with the present invention.
Figure 11B:
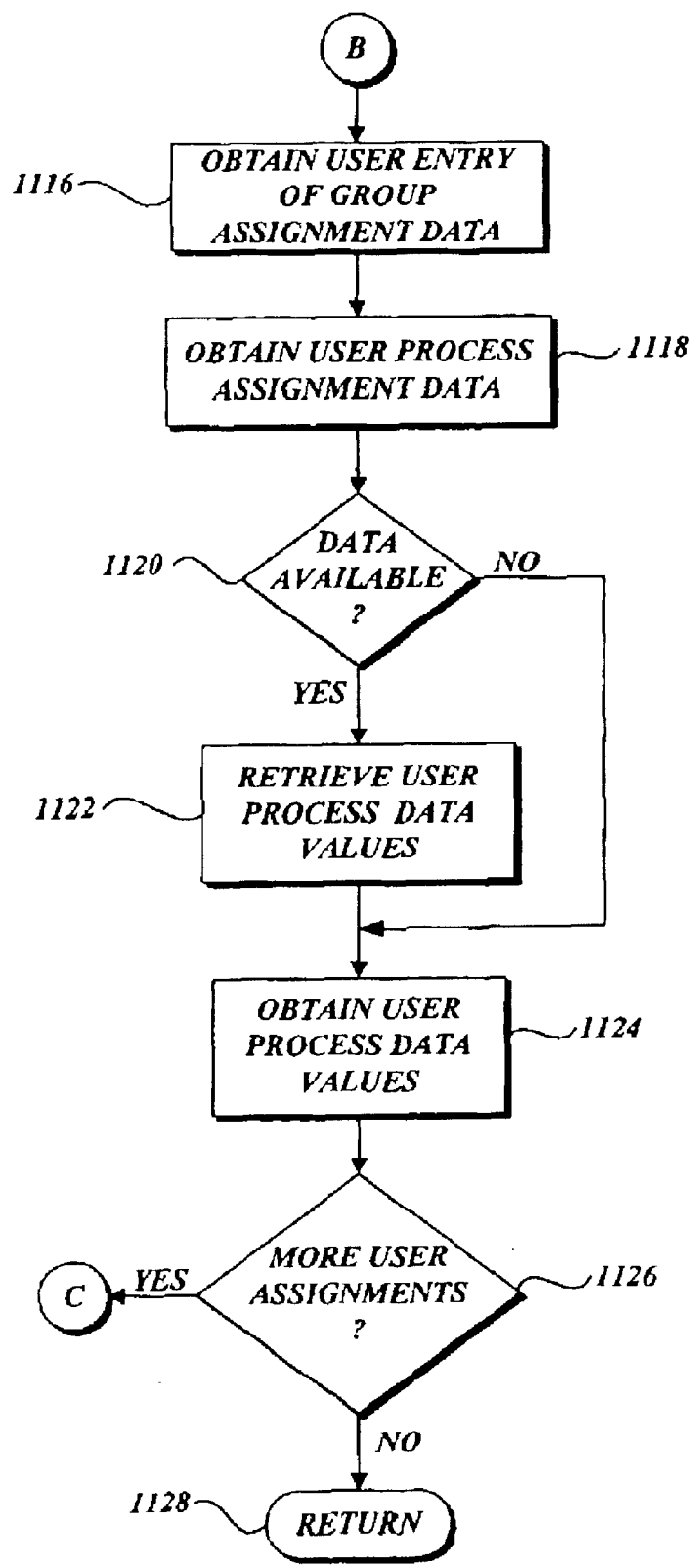

FIGS. 10, 11A and 11B are flow diagrams illustrative of various process create or modify premises sub-routines implemented by the central server 210 of an integrated information system 200 in accordance with the present invention. With reference to FIG. 10, at block 1002, the central server 210 obtains a list of available premises for current system clients. At decision block 1004 a test is conducted determine whether a desired premises is on the list. If the premises is on the list, the central server 210 retrieves existing premises values at block 1006. For example, the central server 210 may obtain the data values from the databases 212. If the desired premises is not on the list, or once the central server 210 has obtained the premises data, at block 1008, the central server 210 processes the user entry of the premises data. In an illustrative embodiment of the present invention, the user interface application 414 utilizes block 1008 to obtain client contact data, such as client address and communication information. Additionally, the user interface application 414 obtains premises user data related to the selected premises. Once the central server 210 obtains the premises data entry, at block 1010, the central server stores the updated premises data and the sub-routine 1000 returns to sub-routine 500 at block 1012.

Turning now to FIGS. 11A and 11B, a process premises user data entry sub-routine will be described. In an illustrative embodiment of the present invention, the premises data can include user premises assignment data, user group assignment data, and user process assignment data. With reference to FIG. 11A, at block 1102, the central server 210 obtains user premises assignment data. At decision block 1104, a test is conducted to determine whether user process assignment data is available. If the user premises assignment data is available, at block 1106, the central server 210 retrieves the user premises data values. If the data is not available, or once the user premises data values have been retrieved at block 1108 the central server 210 obtains user premises assignment data values from the user input. For example, the user interface application 414 may import data files, obtain keyboard or computer mouse entries, obtain voice inputs, and the like. In one aspect, the user data entry can include data modifying an existing user data record. In another aspect, the user data entry can include data defining new user data records.

At block 1110, the central server obtains a list of the user group assignment data. At decision block 1112, a test is conducted to determine whether the user group data is available. If the data is available, the central server 210 retrieves the user premises data values at block 1114. With reference to FIG. 11B, if the group assignment data is not available, or once the central server 210 has retrieved the user group assignment data, at block 1116, the user interface application 414 of the central server obtains the user entry of the group assignment data. As described above, the user interface application 414 can obtain the group assignment data entry in a variety of manners.

At block 1118, the central server 210 obtains user process assignment data. At decision block 1120, a test is conducted to determine whether the user process assignment data is available. If the user process assignment data is available, the central server 210 retrieves the user process data values at block 1122. For example, the central server 210 may retrieve the data from the databases 212. If the data is not available, or once the central server 210 has retrieved the user process data values, at block 1124, the central server 210 obtains the user process data values. At decision block 1126, a test is conducted to determine whether there are more user premises assignments. If there are more user premises assignments, the routine 1100 returns to block 1108. Alternatively, if there are no more assignments, the sub-routine 1100 returns to sub-routine 1000 at block 1128.

Returning to FIG. 5A, at decision block 514, a test is conducted to determine whether the user wishes to create or modify one or more locations corresponding to the selected client and premises. If the user does not wish to create or modify one or more locations, the routine 500 proceeds to decision block 518 (FIG. 5B), which will be explained in greater detail below. Alternatively, if the user wishes to create or modify locations, the central server 210 processes the create or modify location request at block 516.

Figure 12A:
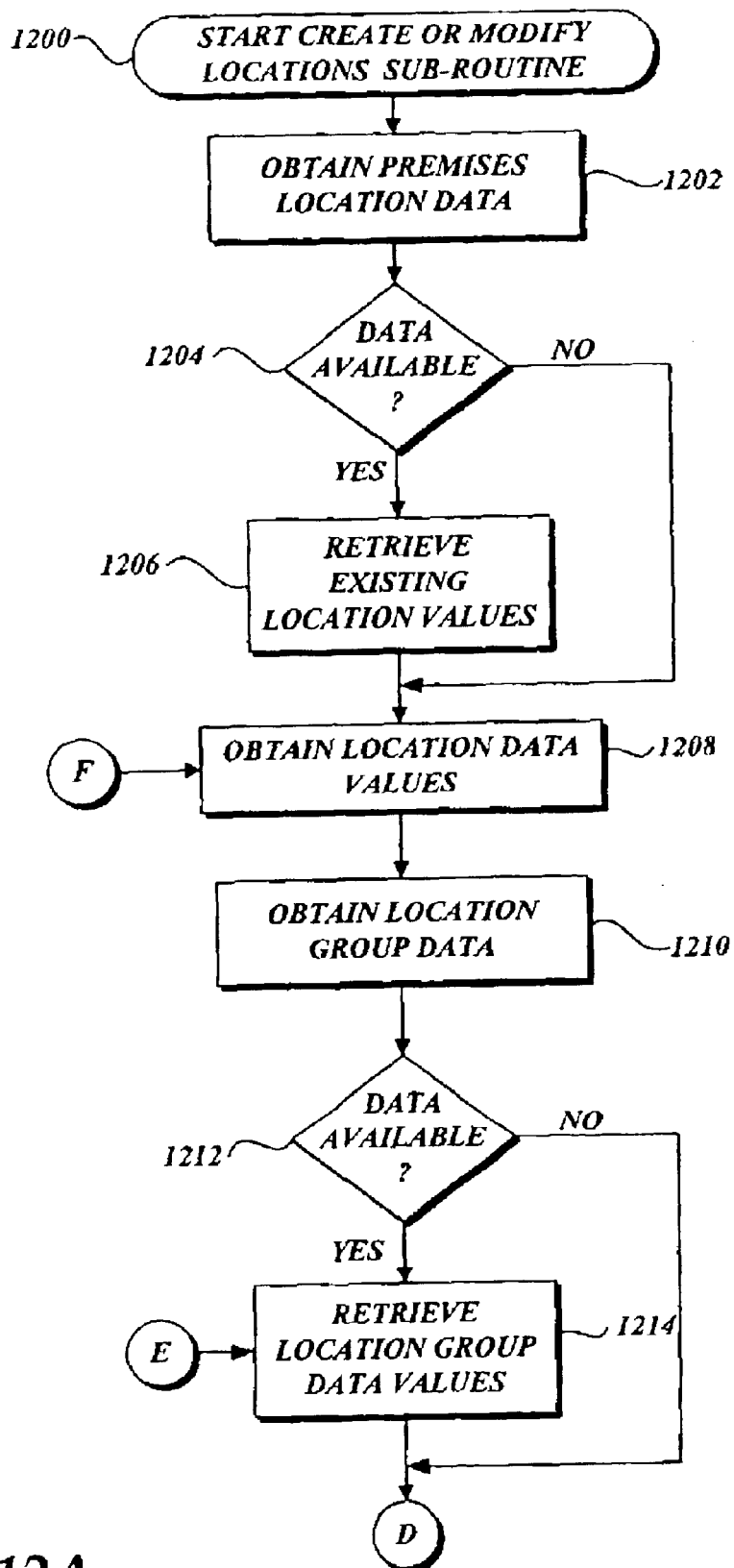
FIGS. 12A and 12B are flow diagrams illustrative of a create or modify locations sub-routine implemented by an integrated information system in accordance with the present invention.
Figure 12B:
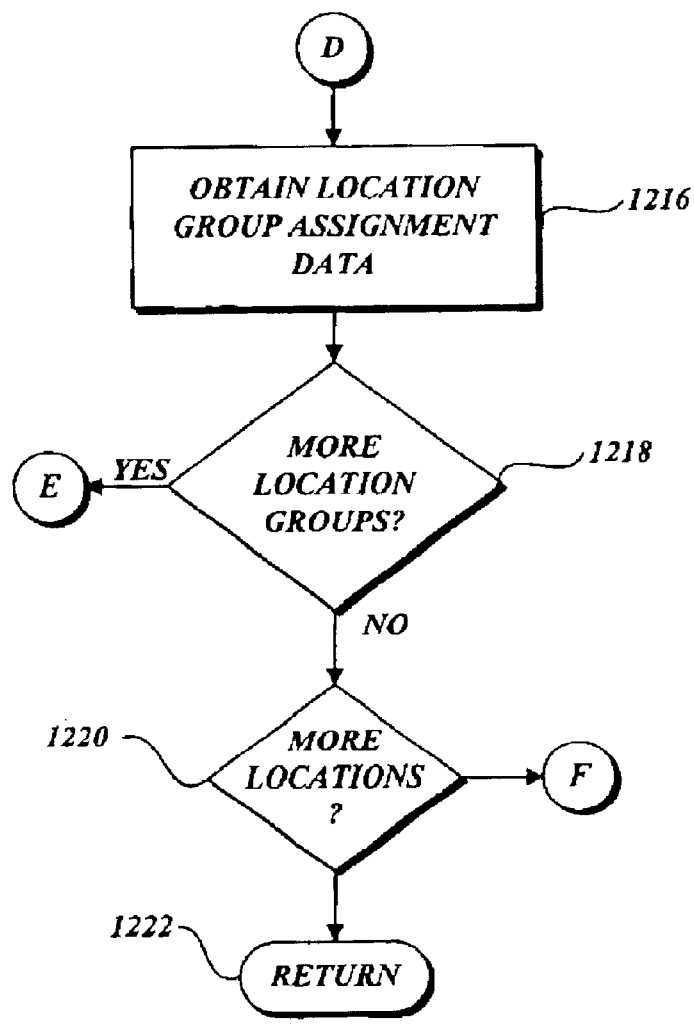

FIGS. 12A and 12B are flow diagrams illustrative of a create or modify location sub-routine 1200 implemented by the central server 210 in accordance with the present invention. In an illustrative embodiment of the present invention, the location data can include premises location data and location group data. With reference to FIG. 12A, at block 1202, the central server 210 obtains premises location data. At decision block 1204, a test is conducted to determine whether the desired premises location data is available. If the premises location data is available, at block 1206, the central server 210 retrieves existing location values. In an illustrative embodiment of the present invention, the user interface application 414 of the central server 210 may generate a list of available locations for the selected premises. If the premises location data is not available, or once the premises location data has been retrieved, at block 1208, the central server obtains location data values.

Figure 17:
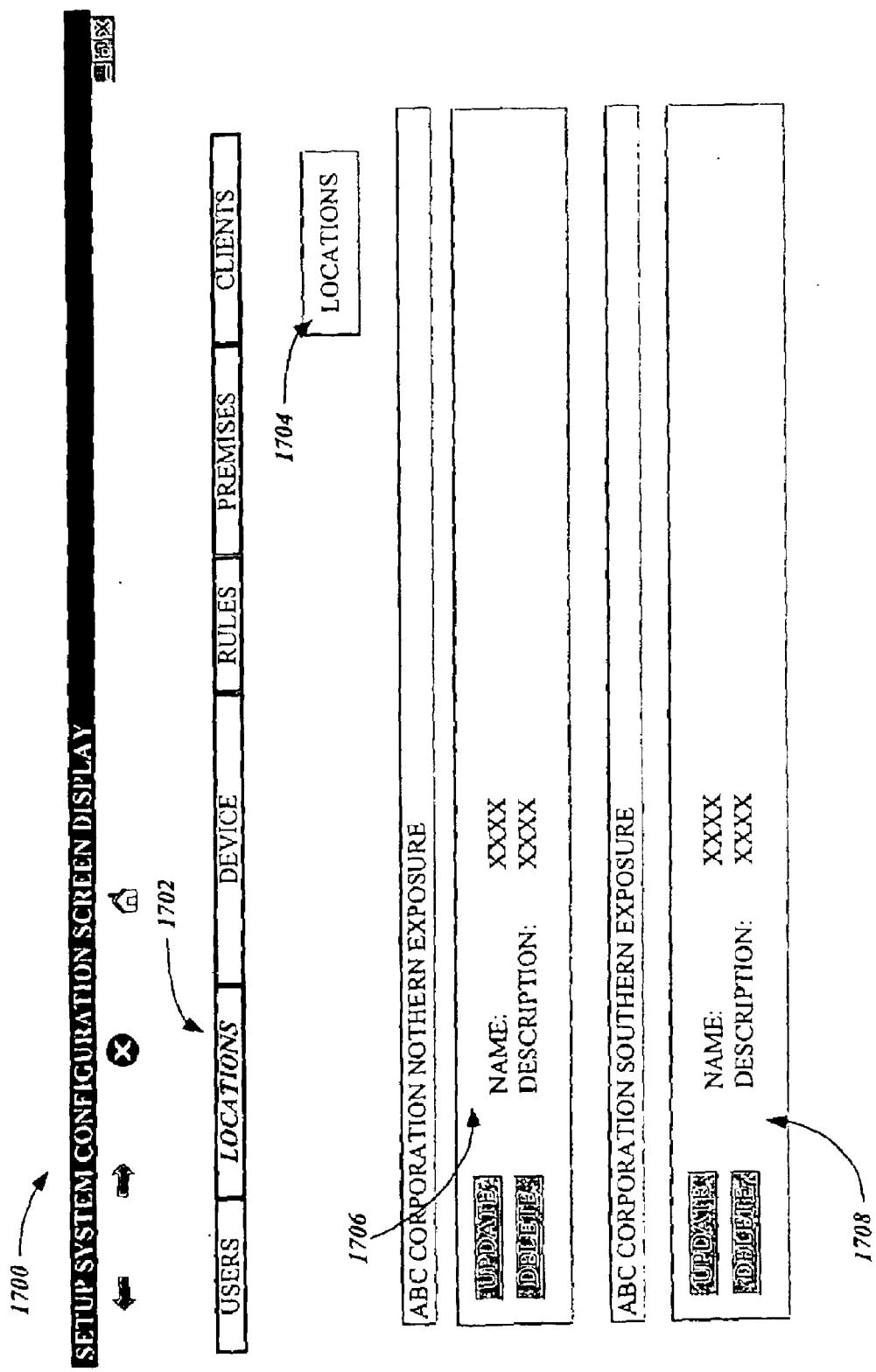
FIG. 17 is a block diagram representative of a screen display illustrating an integrated information system location selection interface in accordance with the present invention.

FIG. 17 is a block diagram representative of a screen display 1700 illustrating a integrated information system location selection interface generated by the central server 210 in accordance with the present invention. As illustrated in FIG. 17, the screen display includes a user selection portion 1702 for selecting the modification or creation of location data. The screen display also includes an identification portion 1704 for informing a user of which data is currently being modified or created. Additionally, the screen display further includes data entries portions 1706 and 1708 for displaying to the user the available location data and for facilitating the entry of additional data. One skilled in the relevant art will appreciate that alternative screen displays may be utilized in accordance with the present invention.

Returning to FIG. 12A, at block 1210, the central server 210 obtains location group data. At decision block 1212, a test is conducted to determine whether the group location data is available. If the group location data is available, at block 1214, the central server 210 routine retrieves location group data values. With reference to FIG. 12B, if the location group data values are not available, or once the central server 210 has retrieved the location group data, at block 1216, the central server 210 obtains location group assignment data. At decision block 1218, a test is conducted to determine whether there are more location groups. If there are more location groups, the central server retrieves additional location group data values at block 1214 (FIG. 12A). Alternatively, if there are no more location groups, at decision block 1220, a test is conducted to determine whether there are more locations to be modified. If there are more locations, the sub-routine 1200 returns to block 1208. Alternatively, if there are no more locations, the sub-routine 1200 returns at block 1222. One skilled in the relevant art will appreciate that the central server 210 may implement the various decision blocks of sub-routine 1200 in a single action or series of actions.

Turning now to FIG. 5B, at decision block 518 a test is conducted to determine whether the user wishes to create or modify devices and rules. If the user does not wish to create or modify devices and rules, the process 500 proceeds to block 522, which will be described in greater detail below. Alternatively, if the user wishes to create or modify devices and rules, the central server 210 processes the create or modify devices and rules sub-routine at block 520.

Figure 13A:
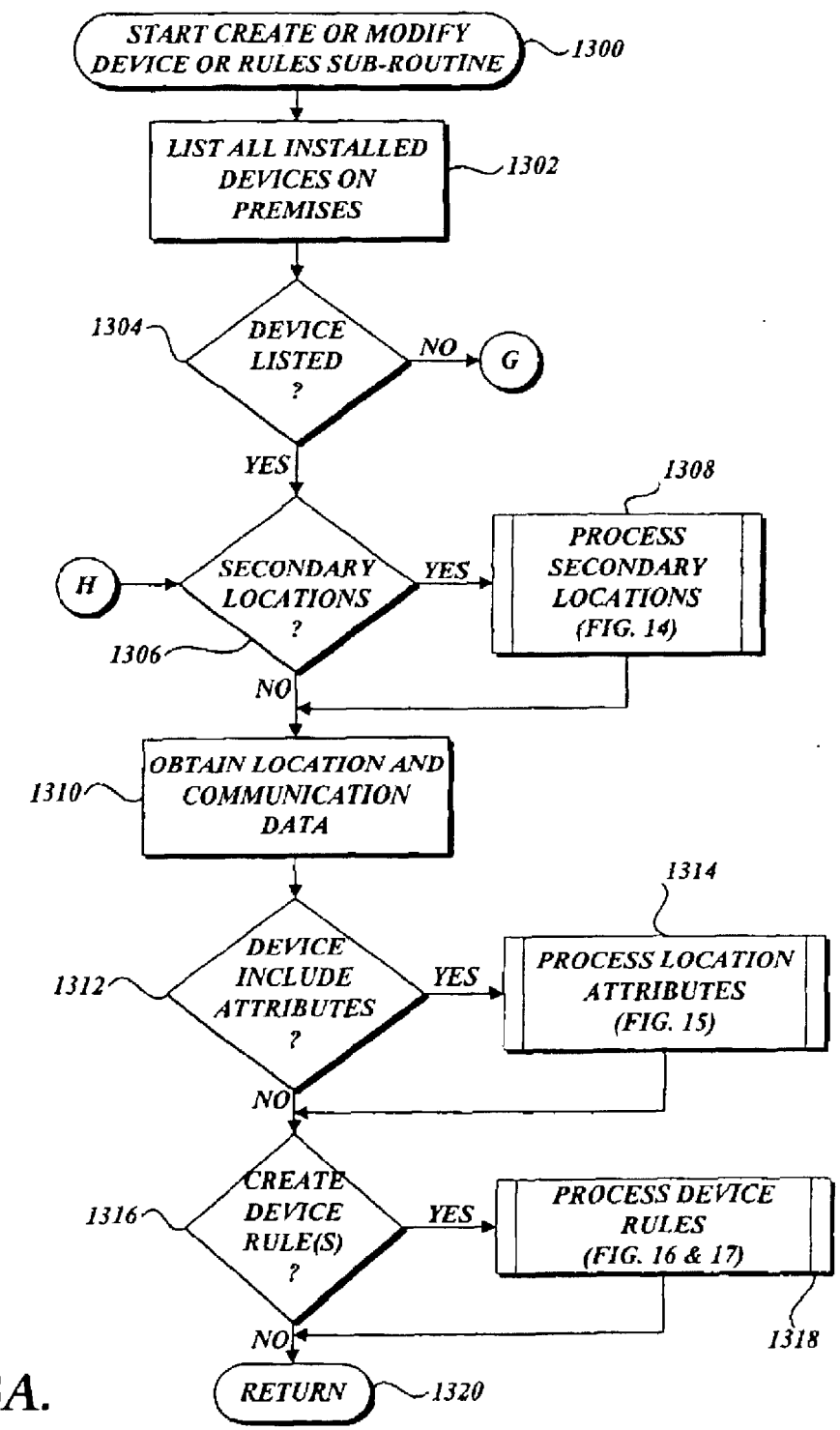
FIGS. 13A and 13B are flow diagrams illustrative of process monitoring device and monitoring device rules sub-routine implemented by an integrated information system in accordance with the present invention.
Figure 13B:
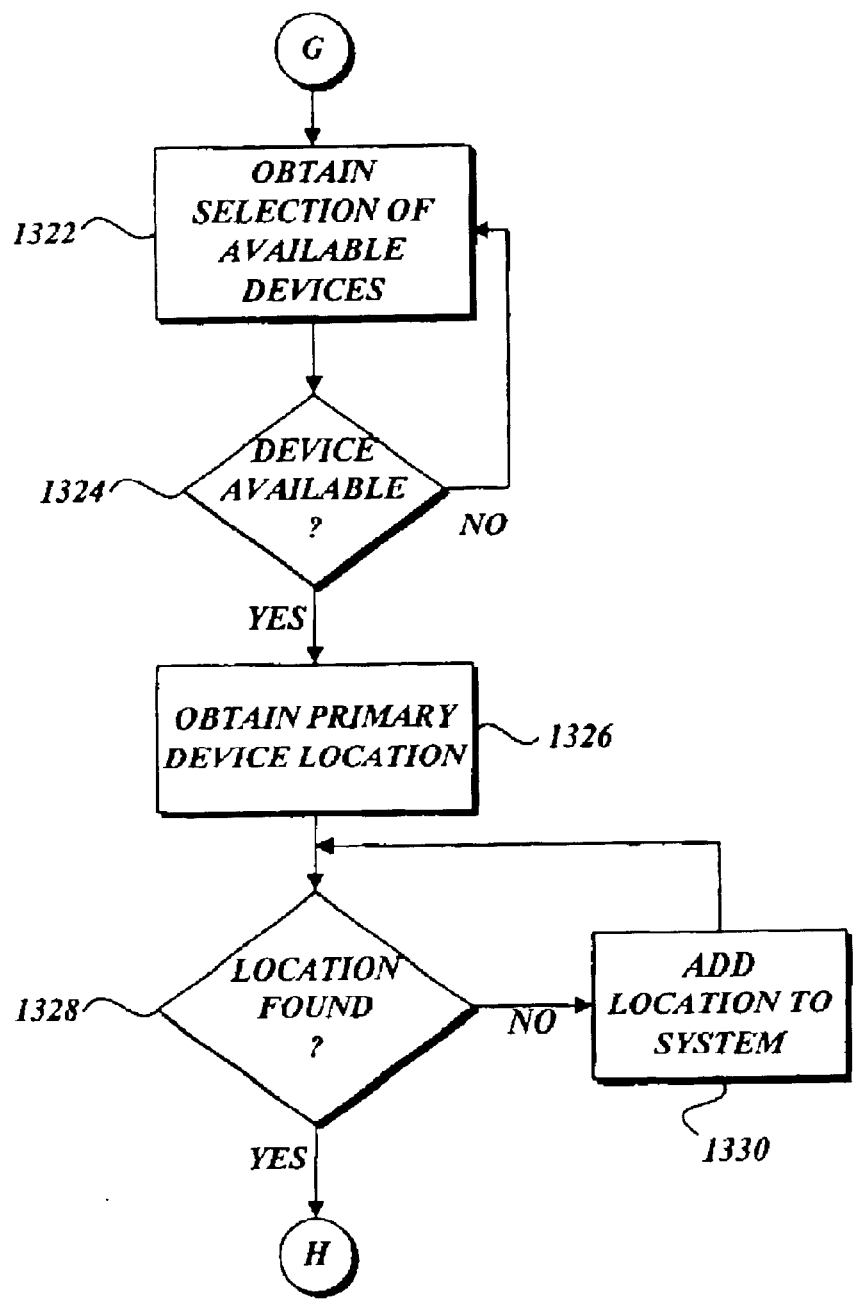

FIGS. 13A, 13B, 14, 15, 16 and 17 are flow diagrams illustrative of various sub-routines implemented by the central server 210 to create or modify devices and rules in accordance with the present invention. With reference to FIGS. 13A and 13B, a create or modify devices and rules sub-routine 1300 will be described. At block 1302, the central server 210 lists all installed monitoring devices 206 and/or output devices 208 that are found within a previously selected premises. In accordance with the present invention, the user interface application 414 can generate a screen display to facilitate the selection of installed devices within the premises. More specifically, in an actual embodiment of the present invention, the user interface application 414 may utilize tree-structures and data tables to facilitate the selection of devices and the management of device attributes.

Figure 18:
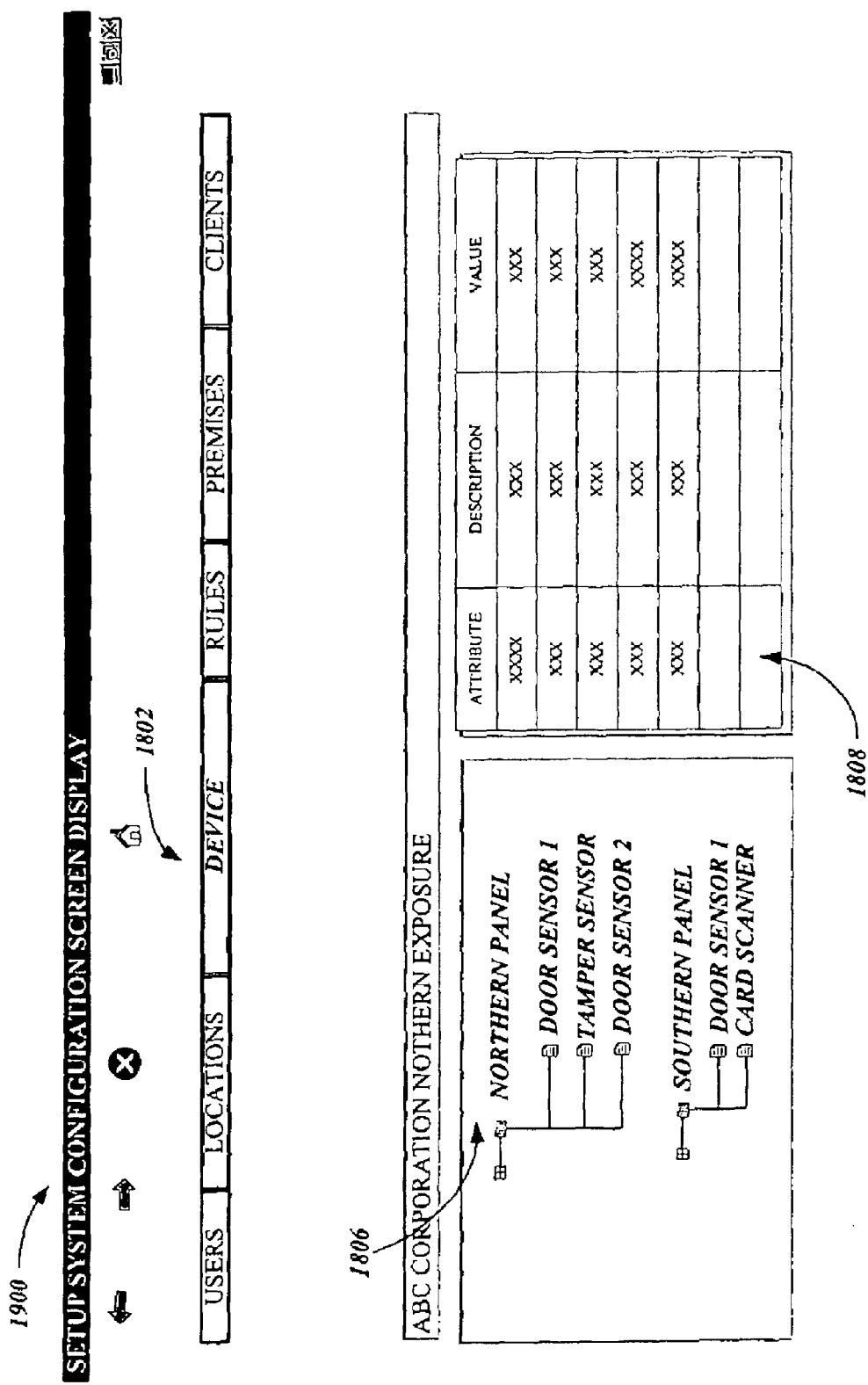
FIG. 18 is a block diagram representative of a screen display illustrating an integrated information system device selection interface having a tree-structure in accordance with the present invention.

FIG. 18 is a block diagram representative of a screen display 1800 illustrating a integrated information system device selection interface having a tree-structure in accordance with the present invention. The screen display 1900 includes a user selection portion 1802 for selecting the modification or creation of location data. As illustrated in FIG. 18, the user can select to manipulate various devices by selecting the corresponding tab of the user selection portion 1802. The screen display further includes a tree-structure portion 1804 for hierarchically displaying which monitoring device has been installed into the premises. In an actual embodiment of the presentation, the data processing application 412 of the central server 210 may configure the tree-structure portion 1904 based on the authorization of the user, a most recently utilized list, or a combination thereof. Moreover, the data processing application 412 may utilize additional information inputted by the user, such as specific device, to determine device compatibility and adjust the tree-structure accordingly. One skilled in the relevant art will appreciate that a user can select a specific device, through the manipulation of the elements of a graphical user interface, or of peripheral devices linked to a graphical user interface, such as a mouse or touch pad.

Returning to FIG. 13A, at decision block 1304, a test is conducted to determine whether a desired device is listed. If the desired device is not listed, the routine 1300 proceeds to block 1322 (FIG. 13B), which will be explained in detail below. If the desired device is listed and selected, at decision block 1306, a test is conducted to determine whether the selected device has any auxiliary locations. In accordance with the present invention, an auxiliary location includes one or more areas or zones within a premises with which a monitoring device 206 is associated. For example, a pan-tilt-zoom ("PTZ") camera may monitor a door as a primary location and a portion of a hallway as an auxiliary location. If the device has auxiliary locations, the central server 210 processes the auxiliary location selection at block 1308.

Figure 14:
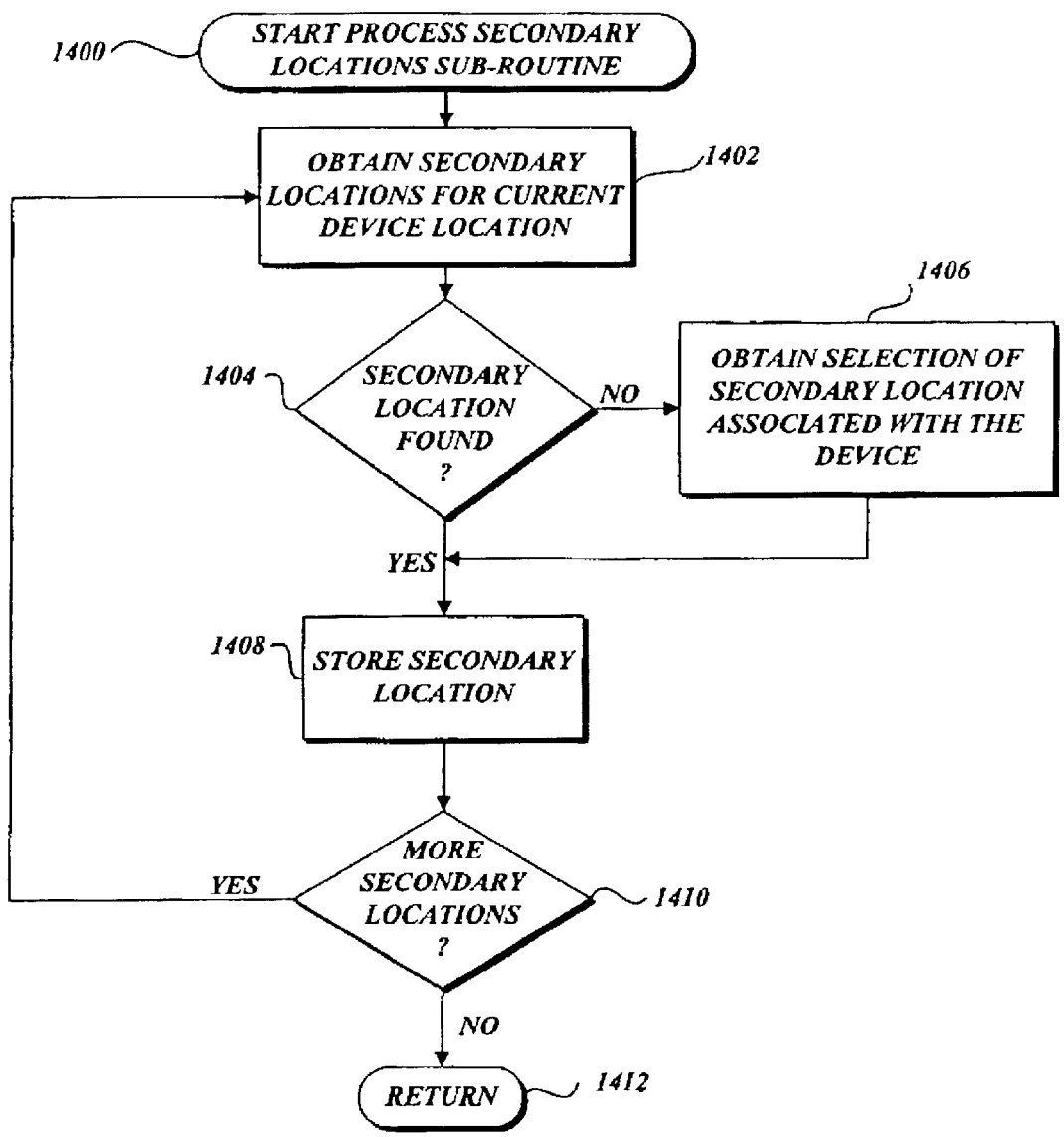
FIG. 14 is a flow diagram illustrative of a process auxiliary locations sub-routine implemented by an integrated information system in accordance with the present invention.

FIG. 14 is a flow diagram illustrating a process auxiliary device locations sub-routine 1400 implemented by the central server 210 in accordance with the present invention. At block 1402, the central server 210 obtains a list of all known auxiliary locations corresponding to the selected monitoring device. At decision block 1404, a test is conducted to determine whether a desired auxiliary location is found in the list. If the desired auxiliary location is not found, at block 1406, the user interface application 414 obtains a user selection of an auxiliary location desired. For example, the user may define an auxiliary location by naming the location and defining some parameters of the location. At block 1408, the data processing application 412 of the central server 210 stores the selected auxiliary location. At decision block 1410, a test is conducted to determine whether the user wishes to select additional auxiliary locations. If the user wishes to select additional auxiliary locations, the sub-routine 1400 returns to block 1402. Alternatively, the sub-routine returns to sub-routine 1300 at block 1412.

Returning to FIG. 13A, once the auxiliary locations have been processed, or if no auxiliary locations are selected/exist, at block 1310, the central server 210 obtains the device location and communication attributes. In an illustrative embodiment of the present invention, the device location and communication attributes can include an Internet protocol ("IP") address, a unique name, computing device port settings, zone settings for monitoring, and the like. At decision block 1312, a test is conducted to determine whether a selected device includes device attributes. If the selected device does not include attributes, the sub-routine proceeds to decision block 1316, which will be explained in greater detail below. Alternatively, if the selected device includes device attributes, the central server 210 processes the device attributes at block 1314.

Figure 15:
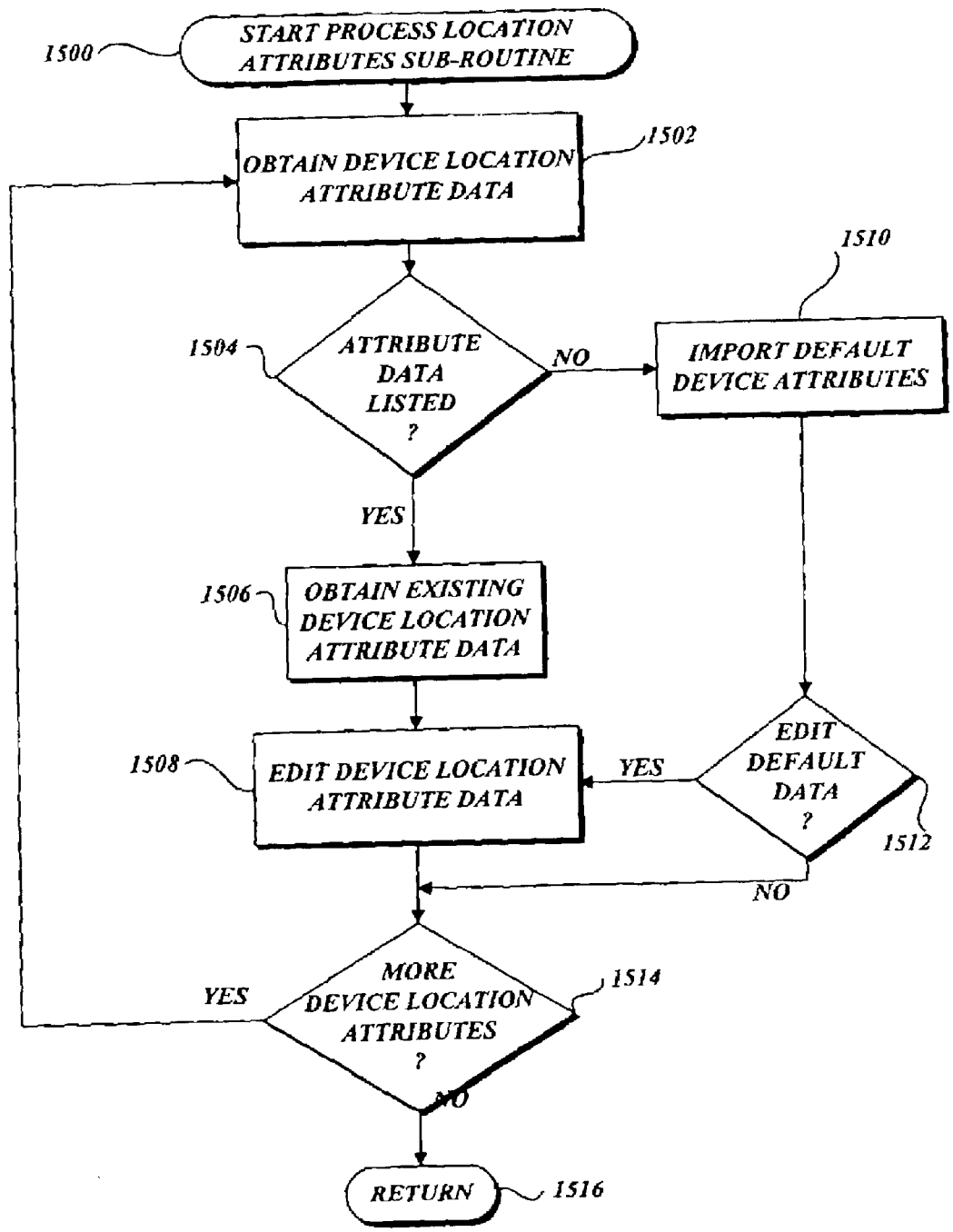
FIG. 15 is a flow diagram illustrative of a process location attributes sub-routine implemented by an integrated information system in accordance with the present invention.

FIG. 15 is a flow diagram illustrative of a process device location attributes sub-routine 1500 implemented by the central server 210 in accordance with the present invention. At block 1502, the central server obtains the device location attribute data. At decision block 1504, a test is conducted to determine whether the device location attribute data exists. If the device location attribute data exists, at block 1506, the central server 210 obtains and displays the listed device location attributes. At block 1508, the user interface application 414 of the central server 210 obtains any user edits to the device location attribute data. Referring again to FIG. 18, the screen display 1800 further includes a data table portion 1806 for displaying to the user various device location attributes of a device selected in the tree-structure portion 1804. The data table portion 1806 allows the user to review the various device attributes and modify them by manipulating a user interface.

Referring again to FIG. 15, if at decision block 1504 the device location attribute data does not exist, at block 1510, the data processing application 412 retrieves any default device attributes for use with the device. For example, the device manufacturer may include some default settings for a device, or an integrated information system 200 administrator may designate default values. At decision block 1512, a test is conducted to determine whether the user wishes to edit the default device location attributes. If the user selects to edit the default attributes, the sub-routine 1500 proceeds to block 1508 as described above.

Once the user has completed editing the device location attributes, or if the user does not wish to edit the default attributes at decision block 1512, at decision block 1514, a test is conducted to determine whether there are additional device location attributes that are to be edited. If there are additional device location attributes, the sub-routine 1500 returns to block 1502. Alternatively, the sub-routine 1500 returns to sub-routine 1300 at block 1516.

Returning to FIG. 13A, at decision block 1316, a test is conducted to determine whether the user wishes to create a device rule for the selected device. If the user wishes to create or modify a device rule, the central server 210 processes the device rule at block 1318. If the user does not wish create or modify a device rule or once the device rule has been processed, the sub-routine 1300 returns to routine 500 at block 1320.

Figure 16:
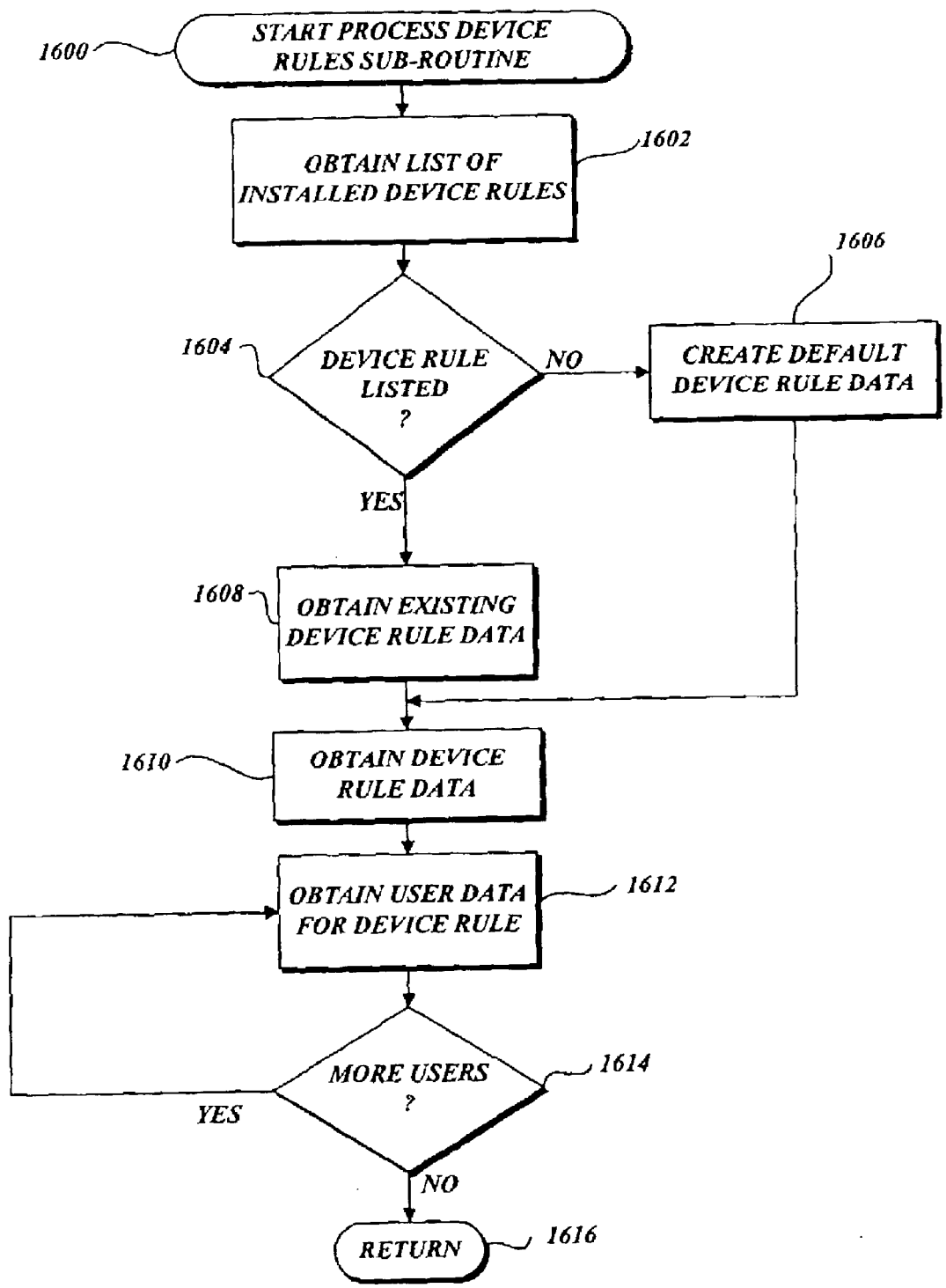
FIG. 16 is a flow diagram illustrative of a process device rules sub-routine implemented by an integrated information system in accordance with the present invention.

FIG. 16 is a flow diagram of a process device rules sub-routine 1600 implemented by the central server 210 in accordance with the present invention. At block 1602, the central server 210 obtains a list of installed device rules. At decision block 1604, a test is conducted to determine whether a desired device rule is listed. If no device rule is listed, at block 1606, the central server 210 obtains default rule data for the device. In an illustrative embodiment of the present invention, the default data may be set by the user or by an integrated information system administrator. Alternatively, if the desired device rule is found, at block 1608, the central server 210 obtains the existing device rule data.

Figure 19:
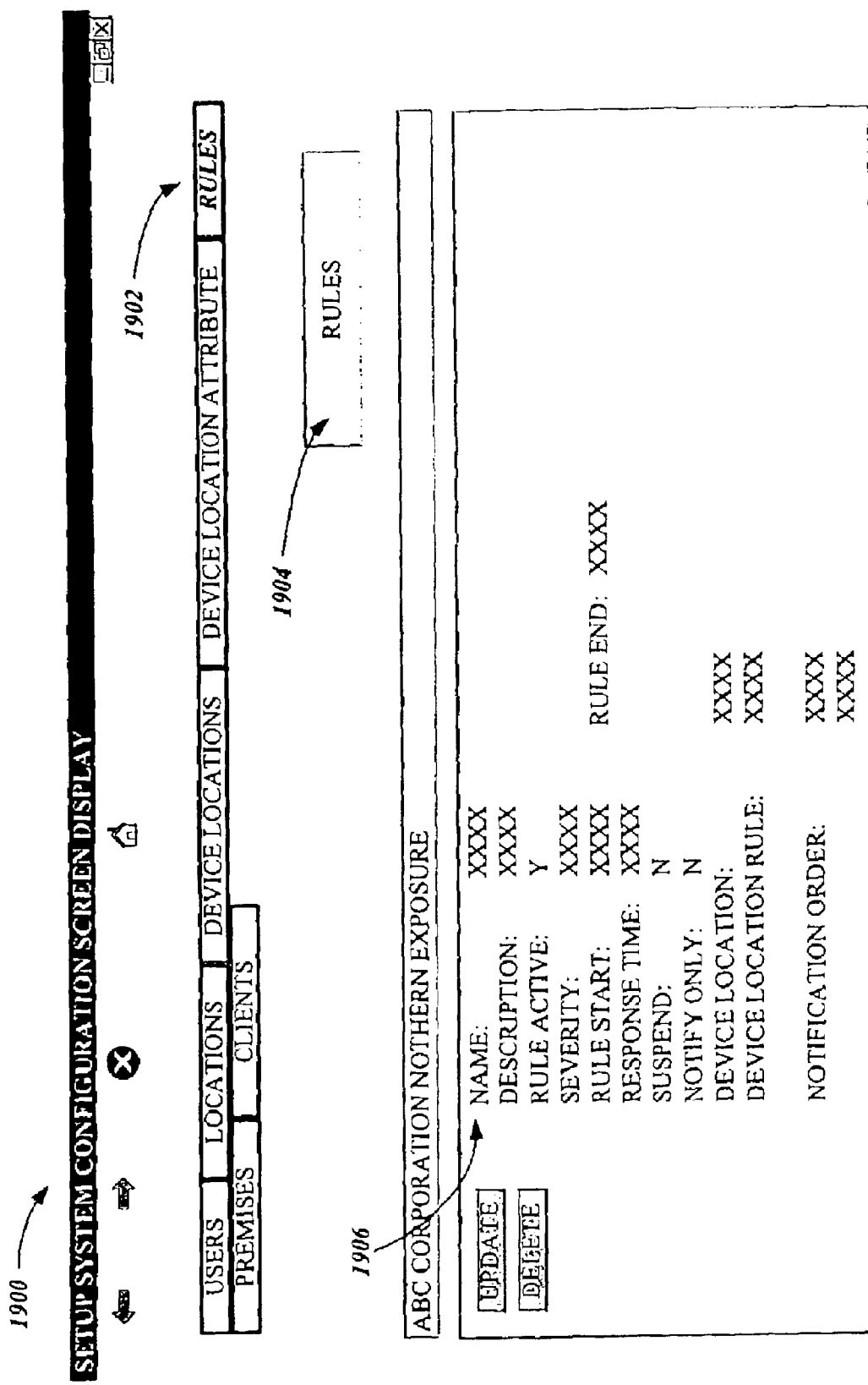
FIG. 19 is a block diagram representative of a screen display illustrating an integrated information system monitoring device processing rules selection interface in accordance with the present invention.

FIG. 19 is a block diagram representative of a screen display 1900 illustrating a integrated information system monitoring device processing rules selection interface generated by the user interface application 414 of the central server 210 in accordance with the present invention. The screen display 1900 includes a user selection portion 1902 for selecting the modification or creation of location data and a display portion 1904 for informing the user what data is being edited. As illustrated in FIG. 19, the user can select to manipulate various devices by selecting the corresponding tab of the user selection portion 1902. The screen display 1900 further includes a rules display portion 1906 for displaying and editing rule details, as will be explained in better detail below.

Returning to FIG. 16, at block 1610, the user interface application 414 obtains device rule data from the user. In an illustrative embodiment of the present invention, the user interface application 414 can obtain device rule data relating to a rule name, rule purpose, effective date ranges, severity of a violation, and corresponding device/location information. At block 1612, the user interface application 414 obtains notification information from the user. In an illustrative embodiment of the present invention, the notification information can include a selection of a set of user, notification routing information, and timing information. At decision block 1614 a test is conducted to determine whether there are more users to add to the notification. If so, the sub-routine 1600 returns to block 1612. If no additional users are to be added, the sub-routine 1600 returns at block 1616.

Turning now to FIG. 13B, if at decision block 1304, the desired device is not listed, at block 1322, the central server 210 obtains a list of all available devices to be installed. In an illustrative embodiment of the present invention, the central server 210 databases 212 may maintain a list and attributes of a number of devices that may be installed in the integrated information system 200. With reference to FIG. 18, the user interface application 414 may generate a tree-structure screen interface to facilitate a user selection. At decision block 1324, a test is conducted to determine whether the desired device is found in the list of available devices. If the device is not available, the sub-routine 1300 returns to block 1322 to obtain an indication of another device. Alternatively, the user may provide configuration information for a specific device, such as by downloading information via the user interface application 414.

Once the device has been selected, at block 1326 the central server obtains a primary location for the device. At decision block 1328, a test is conducted to determine whether the specified location is recognized by the integrated information system. If the location is not recognized, at block 1330, the user inputs the desired location to be recognized. If the location is recognized or once the location has been entered, the sub-routine returns to decision block 1306 (FIG. 13A), which was previously explained.

Returning to FIG. 5B, at block 522, the central server 210 configures the integrated information system 200 in accordance with the user inputs. In an illustrative embodiment of the present invention, the premises interface application 412 of the central server 210 may transmit the necessary configuration data for each monitoring device 206. Additionally, the data processing application 412 may provide any necessary translation processes that allow the central server 210 to communication with the one or more premises servers 204. In an alternative embodiment, the central server 210 may implement the configuration changes as they are received from the user, and block 522 may be omitted. Additionally, the central server 210 may generate a confirmation report at block 522. At block 524, the routine 500 terminates.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. An integrated information system comprising:
   one or more monitoring devices operable to obtain and transmit monitoring data corresponding to a specified premises;
   at least one processing server operable to communicate with the one or more monitoring devices, wherein the processing server is further operable to configure each monitoring device; and
   a computer display operable to generate a user interface for obtaining a user selection of client, premises, location, monitoring device, and processing rule data and to transmit the data to the processing server;
   wherein the processing server configures the monitoring devices according to the client, premises, location, monitoring device and processing rule data obtained from the user interface.

2. The integrated information system as recited in claim 1, wherein the user interface is further operable to obtain a selection of at least one user associated with the integrated information system.

3. The integrated information system as recited in claim 2, wherein the user is authorized to provide configuration information to the integrated information system.

4. The integrated information system as recited in claim 3, wherein the user is associated with the selected client and is authorized to accept a notification of a processing rule violation.

5. The integrated information system as recited in claim 1, wherein the selected client is associated with multiple premises, and wherein the user interface is further operable to obtain a selection of all the premises associated with the selected client.

6. The integrated information system as recited in claim 1, wherein the selected location corresponds to a geographic location.

7. The integrated information system as recited in claim 1, wherein the selected location corresponds to multiple monitoring devices, and wherein the user interface is further operable to obtain a selection of all monitoring devices associated with the selected location.

8. The integrated information system as recited in claim 1, wherein the selection of a monitoring device includes a selection of a primary and auxiliary location associated with the monitoring device.

9. The integrated information system as recited in claim 1, wherein the selection of a monitoring device includes the selection of one or more monitoring device attributes, wherein the monitoring device attributes can include default values.

10. The integrated information system as recited in claim 1, wherein the selection of the user selection of client, premises, location, monitoring device, and processing rule data includes the selection of a threshold indicating a violation of the selected processing rule.

11. The integrated information system as recited in claim 10, wherein the selection of the client, premises, location, monitoring device, and processing rule data includes a selection of one or more notification acceptors.

12. The integrated information system as recited in claim 1, wherein configuring each monitoring device includes inserting default values for the client, premises, location, monitoring device and processing rule data.

13. The integrated information system as recited in claim 1, wherein the user interface is a graphical user interface displayed on a computing device.

14. The integrated information system as recited in claim 1, wherein the computer display is operable to generate a graphical user interface for obtaining a user selection of the client, premises, location, monitoring device, and processing rule data.

* * * * *

UNITED STATES PATENT AND TRADEMARK OFFICE
CERTIFICATE OF CORRECTION

PATENT NO. : 6,748,343 B2  Page 1 of 1
APPLICATION NO. : 09/967485
DATED : June 8, 2004
INVENTOR(S) : B. Alexander et al.

It is certified that error appears in the above-identified patent and that said Letters Patent is hereby corrected as shown below:

| COLUMN | LINE | ERROR |
|---|---|---|
| Pg. 1, col. 2 | Primary Examiner | "Wacheman" should read --Wachsman-- |
| (74) Pg. 1, col. 2 | Attorney, Agent, or Firm | "O'Connor;" should read --O'Connor-- |

Signed and Sealed this

Seventeenth Day of October, 2006

JON W. DUDAS
*Director of the United States Patent and Trademark Office*